US006115541A

United States Patent [19]

Rhodes

[11] Patent Number: 6,115,541

[45] Date of Patent: Sep. 5, 2000

[54] PARTS WASHER, AND METHOD FOR MAKING COMPONENTS THEREOF

[76] Inventor: Laurence Mark Rhodes, 11825 Grande Vista Dr., Whittier, Calif. 90601

[21] Appl. No.: 08/966,334

[22] Filed: Nov. 7, 1997

[51] Int. Cl.$^{7}$ .......... A47J 27/00

[52] U.S. Cl. .......... 392/441; 134/96

[58] Field of Search .......... 134/105, 108, 134/114, 172, 175, 177, 182, 198–9, 200; 392/441, 445, 447

[56] References Cited

U.S. PATENT DOCUMENTS

| | | | |
|---|---|---|---|
| 3,624,750 | 11/1971 | Peterson | 134/96.1 |
| 4,056,114 | 11/1977 | Boutillette | 134/104.4 |
| 4,763,706 | 8/1988 | Rice et al. | 144/136.1 |
| 4,995,411 | 2/1991 | Lowell et al. | 134/198 |
| 5,205,306 | 4/1993 | Peterson | 134/104.2 |
| 5,303,725 | 4/1994 | Hilgren | 134/56 R |

OTHER PUBLICATIONS

EMC Equipment Manufacturing Corporation, "Automatic Parts Washers," printed brochure, Sep. 1995.

The Mart Corporation, "Tornado 40 High Profile," information regarding Power Blast Manifold (not dated), Maryland Heights, Missouri.

Walnut Grove Mfg. Inc., "Mini Jet Cleaner," printed specification page (not dated), Vancouver, Washington.

Precision Metal Works, "Power Spray Washer Model 110," printed specification and feature page, No. 003355, (not dated).

Better Engineering, "Jet Washing," printed information page, (not dated), Baltimore, Maryland.

JBI Industries, "Top Load Model PCS–TL2," printed specification, (not dated), Springfield, Montana.

*Primary Examiner*—Teresa Walberg
*Assistant Examiner*—Thor S. Campbell
*Attorney, Agent, or Firm*—Christie, Parker & Hale, LLP

[57] ABSTRACT

A parts washer includes a tank for holding a washing liquid. Electrically powered heating and pumping means supply heated washing liquid to a spray manifold to wash parts in an upper portion of the tank. The spray manifold is a tube of rectangular cross section, and has spray holes through an edge of the tube. A movable lid partially covers the tank top to leave a vent gap. A deflectable vapor baffle across the tank under the lid and above the spray manifold provides a releasable seal to vent vapor from the tank through the vapor gap. A horizontal plate in the tank and below the vapor baffle, and a reservoir baffle extending down from the plate enclose a reservoir space for heated washing liquid in communication with the upper portion of the tank. A control circuit supplies electric power to either the heating means or the pumping means, but not to both at the same time.

48 Claims, 14 Drawing Sheets

Fig. 5A
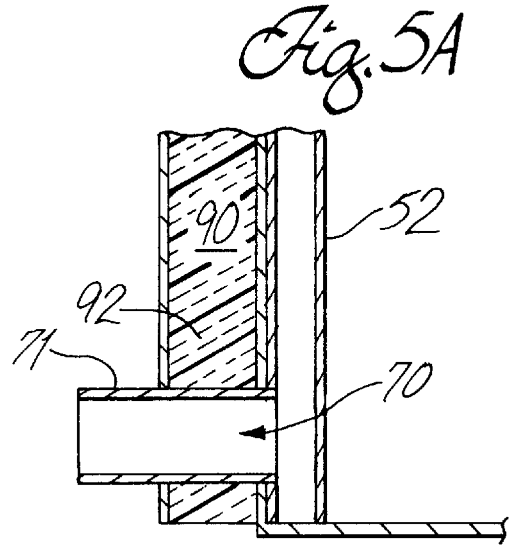
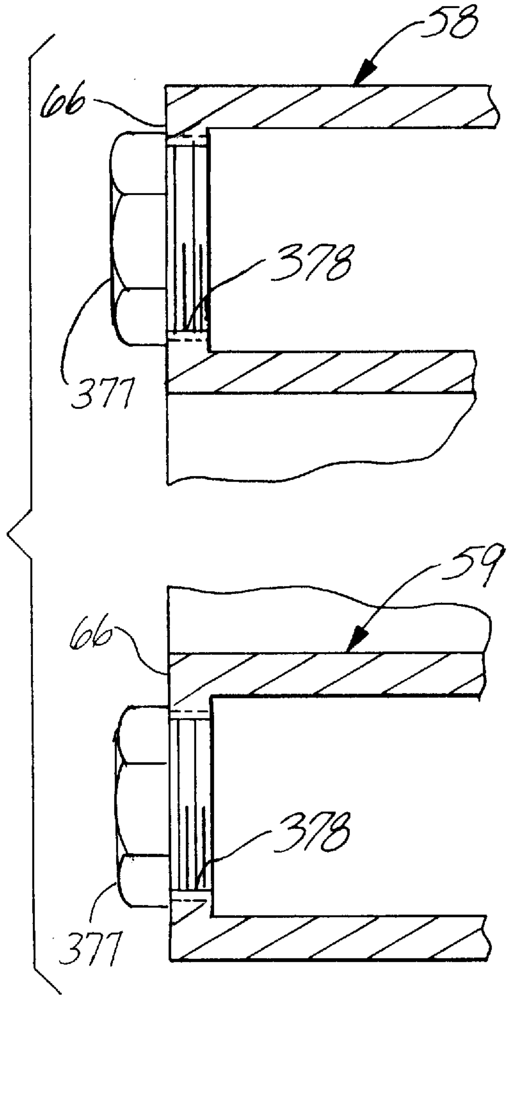
Fig. 4A 304
300
302
280
282
284
286
288
290
292
306
32

PARTS WASHER, AND METHOD FOR MAKING COMPONENTS THEREOF

FIELD OF INVENTION

This invention relates to parts washers of the type used to wash machined parts to remove oil, dirt, or other contaminants.

BACKGROUND OF THE INVENTION

Parts washers have been used for many years to spray a heated washing liquid (usually a solution of soap or other detergent in water) on various products, such as screw machine parts, hardware, and other pieces, which need to be cleaned before further processing or shipment to a customer. Traditional parts washers are slow, expensive to install, and waste water and energy.

Typical parts washers use a turntable which holds parts and rotates about a vertical axis. Such machines use jets to spray fan-shaped streams of washing liquid under high pressure in a relatively narrow band, usually less than 10% of the turntable area. Therefore parts are washed only 10% of the washing cycle time, spending 90% of the wash cycle waiting for the turntable to move them in front of the jets. These prior art machines are slow and require expensive pumps and electrical power supplies to pump the washing liquid at the required high pressure. Prior washers also require steam vent stacks, which makes the washers expensive to install, and prevents them from being easily moved from one work area to another.

SUMMARY OF THE INVENTION

This invention provides an efficient, inexpensive parts washer which is easy to manufacture, operate, and maintain. It cleans parts more efficiently by providing maximum dwell time for the entire area of all parts being washed during the wash cycle. A relatively large number of straight stream jets fully cover a large spray zone with washing liquid sprayed simultaneously on all parts in the spray zone. The straight stream jets do not require a high pressure pump. Moreover, since the large number of jets are trained on the parts being washed 100% of the time, jobs that would previously require 5–10 minutes in a traditional washer will often clean in less than 30 seconds.

The preferred washer of this invention uses a specially designed lid which eliminates the need for steam vent stacking. An insulated reservoir space in the washer holds heated washing liquid, which is kept at the required operating temperature by an electric heater operated only when the pump is not. This low power requirement permits the washer to be plugged into any conventional electrical outlet wired for 110 volts at 15 amps. Thus, since the washer does not require steam vent stacking or special power supply, it is easily moved for operation in various locations in a machine shop.

This invention also includes a V-shaped holder for parts which exposes maximum area of the parts while they are being washed; a parts holder which permits hard to clean parts to be soaked in hot washing solution while other parts are sprayed in another holder which positions parts for maximum simultaneous exposure to sprayed washing liquid; a parts holder which rotates parts about a horizontal axis for faster cleaning, draining and drying; and a cantilever shelf secured to one side of the washer to facilitate parts handling, and thereby increase work throughout.

The preferred parts washer of this invention includes a tank having an upright wall, a bottom, and an open top. A movable lid covers most of the tank, but leaves a vent gap between the lid and the tank wall. A spray manifold mounted around the interior of the tank wall and adjacent an upper portion of the tank includes a spray tube of rectangular cross-section and with longitudinally spaced spray holes through an edge of the spray tube. Electrically powered heating means in a lower portion of the tank heats washing liquid in the tank, and an electrically powered pumping means supplies heated washing liquid from a lower portion of the tank through the manifold and out the spray holes to contact parts in a spray zone in an upper part of the tank. A substantially horizontal heat retention plate is disposed over most of the washing liquid in the lower portion of the tank, and a reservoir baffle extends downwardly from the plate and into the washing liquid to enclose a reservoir space for heated washing liquid. The reservoir baffle is shaped to provide communication between the reservoir space and the spray zone in the tank.

A deflectable vapor baffle is disposed across the upper portion of the tank above the spray zone to close off the interior of the tank below the vapor baffle from ambient air. The vapor baffle is secured to, and spaced below, the lid, and constructed to release pressure from the tank in the space below the vapor baffle through the vent gap between the lid and the tank wall.

Preferably, the lid is hinged to the tank wall along a line substantially parallel to the vent gap, which is located at the rear of the lid so that any sudden release of vapor from the tank interior is directed away from operating personnel, who normally stand in front of the tank.

Switching means are provided for connecting a source of electrical power to the heating means and disconnecting the power from the pumping means, and for connecting the power to the pumping means and disconnecting the power from the heating means so that the pumping means and heating means are not on at the same time. This reduces the power requirement for the washer to an amount which is easily supplied from a conventional electrical outlet wired for 15 amps and 110 volts because the pump and heating means are not operated at the same time. After the washer is loaded with parts to be washed, and the lid is closed, the switching means turns off the electrically power heating means, and turns on the pumping means. The tank is insulated so that the washing solution remains heated during the washing cycle for maximum effectiveness.

In another preferred form of the invention, the parts in the upper portion of the washer are supported in an open mesh, V-shaped basket disposed in the tank to hold the parts in a position for maximum simultaneous exposure to sprayed washing liquid in the spray zone. Alternatively, parts to be washed are secured to a bracket mounted in the tank to be rotated about a substantially horizontal axis in the spray zone. In a further preferred embodiment, the rotatable bracket is in the shape of a crank, and a basket for holding the parts is secured to an offset portion of the crank so that the axis of rotation goes substantially through the center of gravity of the basket. In another preferred embodiment, the horizontal heat retention plate over the reservoir space is removable so that an open mesh basket holding parts to be washed can be submerged in washing liquid in the reservoir space while the pumping means sprays washing liquid on additional parts in the spray zone.

DESCRIPTION OF THE DRAWINGS

FIG. 4A is a view taken on line 4A—4A of FIG. 4 showing clean-out plugs for the spray manifold;

FIG. 5A is a view taken on line 5A—5A of FIG. 5;

DETAILED DESCRIPTION OF THE PREFERRED EMBODIMENTS

Figures 1, 2, 3, 4:
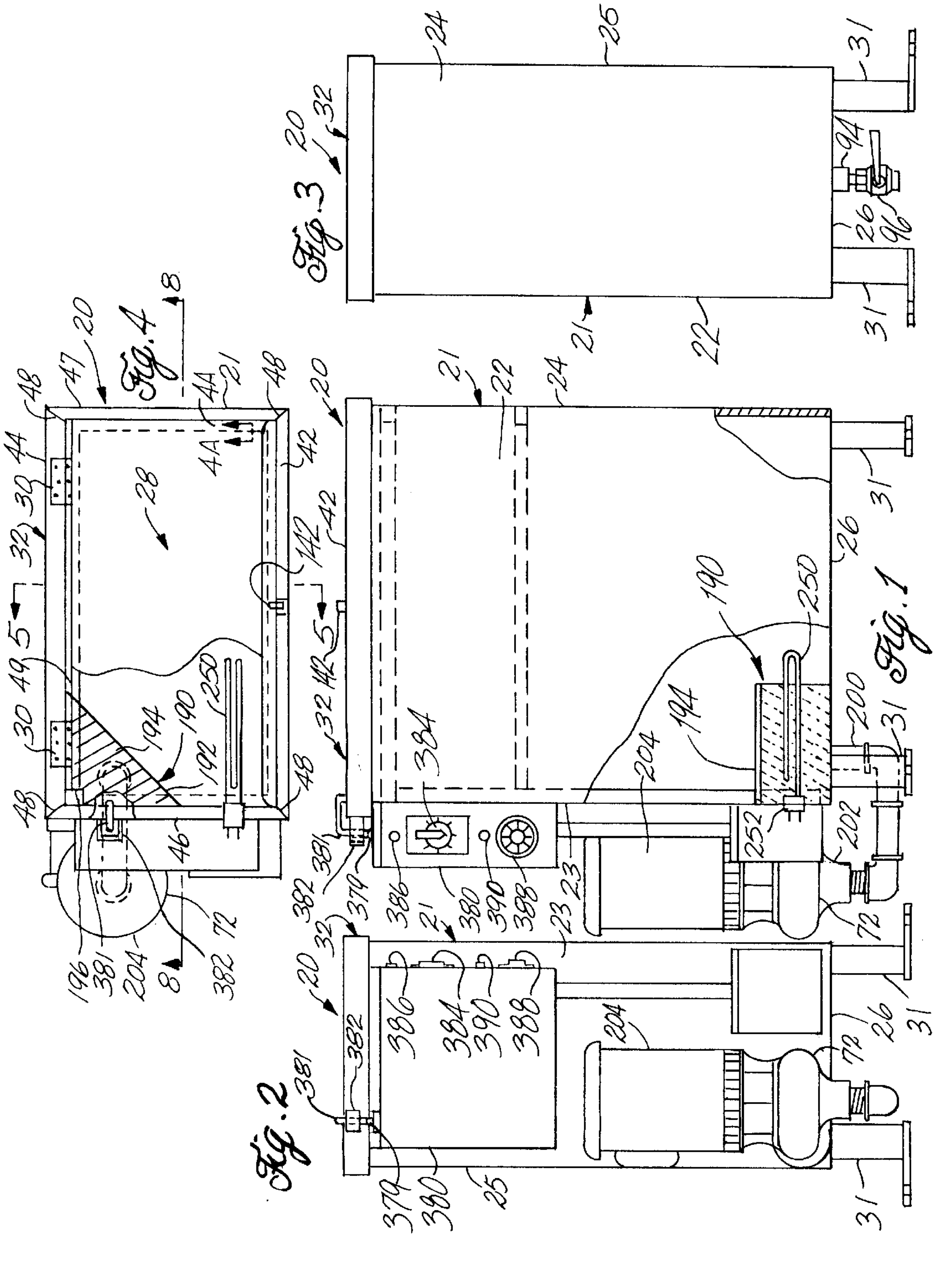
FIG. 1 is a front elevation, partly broken away, of a presently preferred embodiment of the invention.
FIG. 2 is a left side elevation of the parts washer shown in FIG. 1.
FIG. 3 is a right side elevation of the parts washer shown in FIG. 1.
FIG. 4 is a top view, partly broken away of the parts washer shown in FIG. 1.

Referring to FIGS. 1–4, a parts washer 20 includes an upright rectangular tank 21 having a front wall 22 a left side wall 23, a right wall 24, a rear wall 25, a bottom 26, and a cover 28 secured by a pair of hinges 30 to the rear of a horizontal and rectangular top frame 32, which surrounds the cover 28. The washer is supported by a separate downwardly extending foot 31 welded to each corner of the tank bottom.

Figure 5:
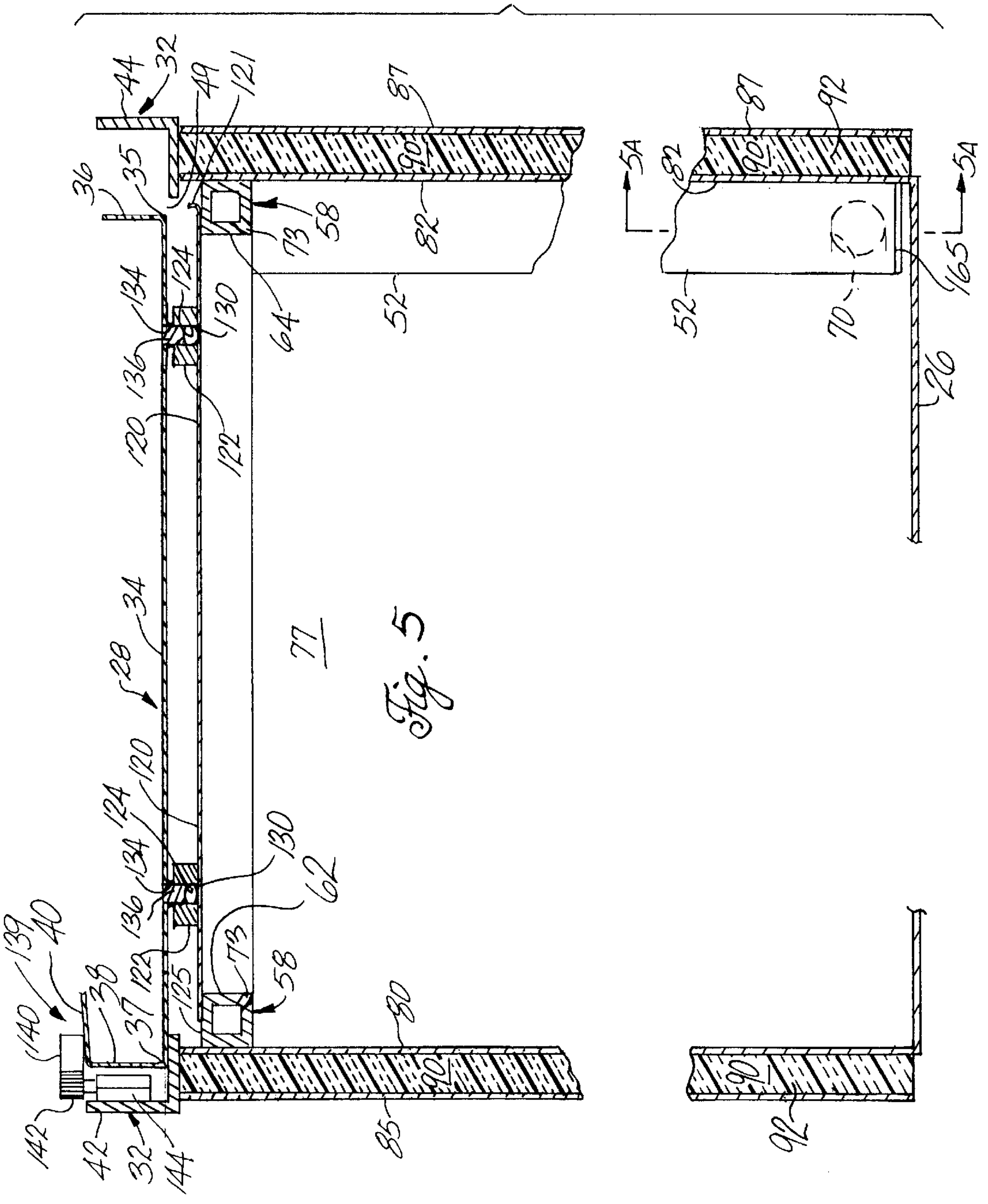
FIG. 5 is a fragmentary view taken on line 5—5 of FIG. 4.

As shown best in FIGS. 4 and 5, the cover 28 includes a rectangular lid 34 made of sheet metal rolled up at a rear edge 35 to form a deflector and lid stop 36 extending upwardly and slightly inwardly with respect to the main plane of lid 34. The forward edge 37 of lid 34 is bent upwardly to form a web 38 perpendicular to the lid, and a flange 40 which extends rearwardly and slightly away from the lid. The web and flange provide stiffness to the lid, and the flange also serves as a handle and latch contact point as described below.

As shown best in FIGS. 4 and 5, the top frame 32 is formed of front, rear, left, and right sections of inwardly and upwardly opening angle iron sections 42, 44, 46 and 47, respectively, welded together at mitered joints 48 at respective adjacent ends. For clarity, the left (as viewed in FIG. 4) hinge is not shown in FIG. 5. As shown in FIGS. 4 and 5, the deflector 36 and rear edge 35 of the lid are parallel to, and spaced forward of, the interior edge of the rear section 44 to provide a vent gap 49 along the rear edge of the lid. As explained below, the deflector and rear frame section 44 direct vapor from the tank upwardly to protect operating personnel (not shown), who usually stand at the front of the tank.

The lid, vapor baffle and top frame sections can be of any suitable material and dimensions. For example, in one embodiment, the lid is formed from a 26¾"×16⅝" sheet of hot-rolled 12 gauge steel so the deflector 36 is ⅞" high and 16⅝" long, the web 38 is 1"×16⅝", and the flange 38 is 1"×16⅝". The four top frame angle iron sections are 1½"×1½"×¼", and of appropriate length to fit around the tank as shown in the drawings and described herein.

Figure 6A:
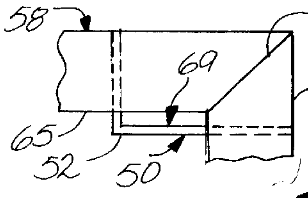
FIG. 6A is a fragmentary plan view of the left rear corner of the manifold.
Figure 6:
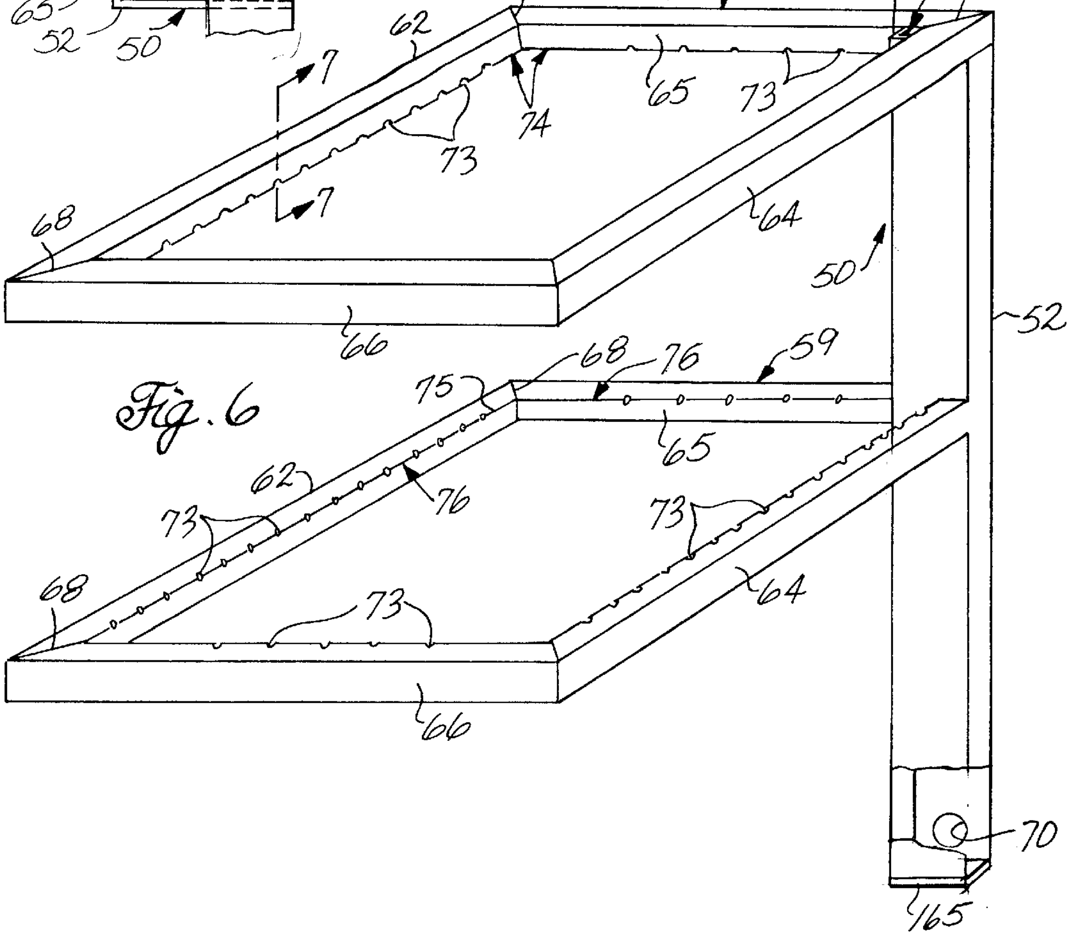
FIG. 6 is perspective view of the preferred spray manifold of the invention.

Referring to FIG. 6, a spray manifold 50 includes a vertical riser 52 connected at its upper end 54 to an upper spray tube 58. The vertical riser is made of 1"×2" "square" tubing with a wall thickness of 0.12", and is oriented in the tank with the 2" dimension parallel to the left and right sides of the tank. A lower spray tube 59 is connected to the vertical riser slightly above the mid-point of the riser. The spray tubes are each in a respective horizontal plane, and each is in the shape of a rectangle with vertical outer walls which make a snug fit against the vertical interior of the tank, as shown in FIGS. 5 and 8. Each spray tube is made of front, rear, left, and right sections 62, 64, 65 and 66, respectively, of square tubing. The ends of each front section 62 are each welded at a mitered joint 68 to the front ends of the left and right sections. The rear end of left section 65 and the left end of rear section 64 of the lower spray tube 59 is each welded to the vertical riser, which is precut to provide openings (not shown) so the interiors of the spray tubes are connected with the interior of the vertical riser as shown in FIG. 6. The upper end of the vertical riser is welded to the under side of the rear end of the left section 65 of the upper spray tube 58, and to the underside of the left end of rear section 64 of the upper spray tube. The under sides of the left rear sections of the upper spray tubes are cut away to provide communication with the interior of the vertical riser. As explained below, the spray tubes are made of ¾" square tubing. Therefore, as shown in FIG. 6A, the left rear corner of the upper spray tube 58 does not completely cover the upper end of the vertical riser, leaving a narrow rectangular gap 69, which is sealed by a welding bead (not shown), between the riser and the left and rear sections 65 and 64 of the upper spray tube. As shown in FIGS. 5A and 6, an inlet bore 70 at the lower end of the left side of the vertical riser is connected as described below to a discharge 71 of a centrifugal pump 72 (FIGS. 2, 4 and 8).

Figure 7:
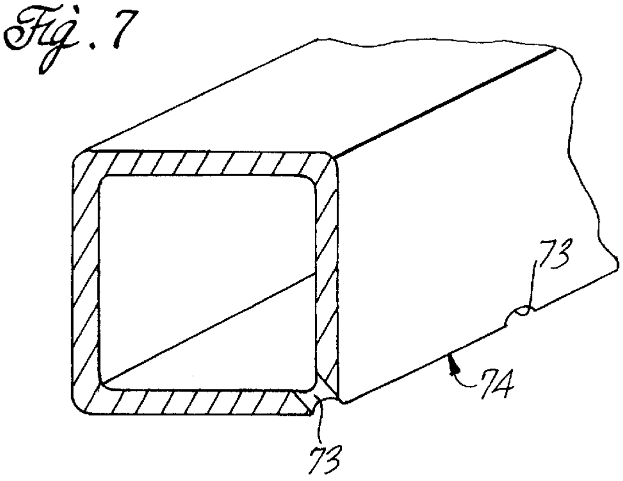
FIG. 7 is a perspective sectional view taken in the direction of line 7—7 of FIG. 6.

As shown in FIGS. 6 and 7 a plurality of longitudinally spaced, downwardly and inwardly extending spray holes 73 are drilled through the lower inner edges 74 of the upper spray tube 58 to be perpendicular to the longitudinal axis of the spray tube. A plurality of longitudinally spaced, upwardly and inwardly extending spray holes 73 are drilled through the upper inner edges 76 of the lower spray tube 59 perpendicular to the longitudinal axis of the tube. Jets of washing liquid are directed from the spray holes into a spray zone 77 (FIG. 8) in an upper part of the washer when the pump operates. The square tubing used in the described embodiment is ¾" square externally and 0.6" square internally, with a wall thickness of 0.075". The diameter of the spray holes may be between about 5⁄64" and about 9⁄64", and are preferably 7⁄64" when washing liquid is pumped at about 80 gal./min. at 10–15 psi.

The use of square tubing for the manifold spray tubes has several advantages over pipe with circular cross section. A round pipe is more difficult to position and hold for precision drilling of spray holes. Moreover, a round pipe of the same flow capacity would extend farther into the washer than the square tubing, and thus reduce the size of the working volume in the washer. Square tubing provides a predictable and easy work piece to clamp in a fabricating position. Moreover, as shown in FIG. 7, the longitudinally extending edges of the square tubing are curved to be concave inwardly and concave outwardly. Each spray hole is drilled through a curved edge of the square tubing. The inwardly concave and outwardly concave shape of the spray tube edge where the spray holes are drilled act as a funnel on the inside and a diverging nozzle on the outside of the spray tube. This produces a strong stream of washing liquid which gradually diverges toward the spray zone 77. All the spray holes may be drilled at the same angle, or they may be at various angles so as to get precision targeting of washing liquid at virtually any desired location within the spray zone of the washer. Ordinarily, the spray holes are each at an angle of about 45° from horizontal, and are substantially perpendicular to the longitudinal axis of the spray tube in which they are formed. However, some, or all, of them may vary from that direction by as much as 25° up or down. This would not be feasible if the holes were drilled through the flat sides of the square tubing because water flow turbulence interferes with good spray action if the holes are drilled at any significant angle different from perpendicular to the major plane of the flat side.

The distance between adjacent spray holes is between about 1" and about 3", depending on the diameter of the spray holes and the wall thickness of the square tubing. For example, the spray holes for the described embodiment each have a diameter of 7⁄64", and the jet of washing liquid from the holes spreads to a circular pattern about 2" in diameter where the jet strikes the parts being washed. Therefore, the spray holes are spaced about 1½" apart to get complete simultaneous coverage of all the parts in the spray zone. Thus, for two spray tubes in a rectangle of about 26"×14", the long sides each have 15 spray holes, and the short sides each have 5, for a total of 80 spray holes directing jets of washing liquid on parts in the spray zone. The straight stream jets from the spray holes provide vigorous scrubbing impact without requiring the high pressure and horsepower needed to produce the fan-shaped jets of prior art washers.

As shown in FIGS. 5 and 8, the front, left, rear and right sides of the tank are each of double wall construction and each include a respective vertical inner front, left, rear, and right wall 80, 81, 82, and 83, respectively, and vertical outer front, left, rear, and right walls 85, 86, 87, and 88, respectively. The inner walls may be of any suitable material, and of any appropriate size. For example, in the described embodiment, the front and rear inner walls are each a sheet of 12-gauge steel, 30 inches high and about 26 inches wide. The left and right inner walls are each a sheet of 12-gauge steel 30 inches high and about 14 inches wide. The upper edge of each inner wall is welded to an inner portion of the under surface of the top frame, and the upper edges of the outer walls are each welded to an outer portion of the under surface of the top frame 32 as shown in FIGS. 5 and 8. Adjacent vertical edges of the inner walls are welded together. Each outer wall is each parallel to and spaced from a respective inner wall to leave an annular insulating space 90, which is filled with suitable insulation 92.

Although the tank of the preferred embodiment is rectangular, it can be of any suitable shape, such as, cylindrical.

Rectangular horizontal tank bottom 26 (FIG. 5) is welded at its edges to the lower edges of the inner walls, leaving the insulating space 90 open at the bottom as shown in FIGS. 5 and 8. The tank bottom may be of any suitable material, such as a sheet of 12-gauge steel in the shape of a rectangle with edges coterminous with the lower edges of the inner walls. A drain line 94 (FIG. 3) in the bottom of the tank midway between the right front and rear feet of the washer includes a ball valve 96, which permits the tank to be drained for cleaning.

Figure 10:
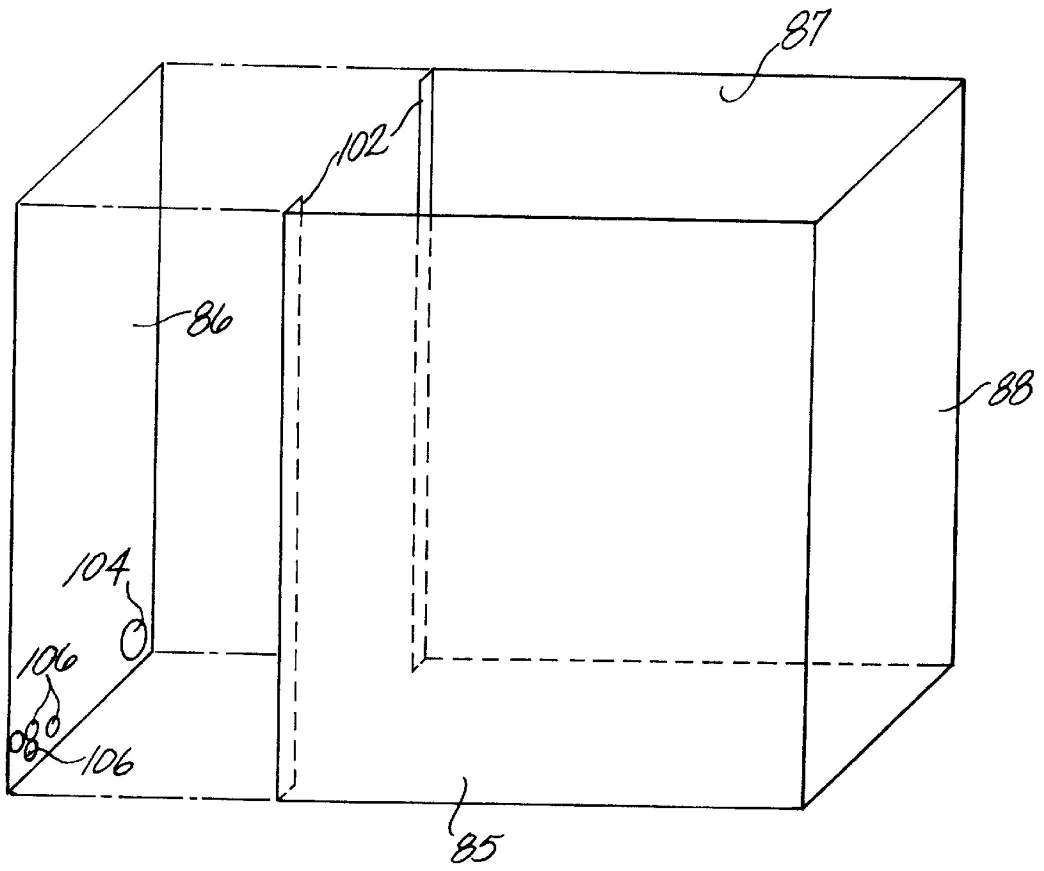
FIG. 10 is a schematic perspective view of an outer shell for the parts washer.

The tank outer walls can also be of any suitable material. Preferably, as shown in FIG. 10, the outer front 85, rear 87 and right 88 walls are formed by bending a continuous rectangular sheet of 16-gauge steel to form the walls and a separate vertical welding flanges 102 formed integrally with the left edges of the front and rear walls. The outer walls are assembled in the final position shown in FIGS. 5 and 8 after the inner walls and insulation are in place. The front and rear outer walls are spread slightly apart so the flanges are spaced farther apart than the front and rear faces of the insulation, and then the outer front, rear and right walls are slipped into position under the top frame, and welded at their respective upper edges to an outer portion of the underside of the top frame. Thereafter, the left outer wall is welded to the top frame and to about the midpoint of the welding flanges 102 so that all four vertical edges of the outer walls present smooth, rounded surfaces without any sharp corners. The left outer wall is small, lightweight, and easy to handle, which facilitates labor-intensive pre-drilling of hole 104 in the rear lower corner to accommodate the pump discharge line 71, and holes 106 in the front lower corner to accommodate a thermostat well 423 (FIG. 14) and a heater 250 (FIG. 1), as described below. The inner left wall 81 has holes (not shown) corresponding to those in the outer left wall to provide necessary access to the tank interior.

Referring to FIG. 5, a horizontal and rectangular vapor baffle 120 is secured to and spaced from the under side of the lid 34. The rear edge 121 of the vapor baffle is rolled up to provide a stiffening effect, and to make that edge less easily deflected upwardly than the forward edge. The vapor baffle is secured to the under side of the lid by four spacers 122 (only two of the spacers are shown in the drawings, see FIG. 5). Each spacer has a bore 124 extending through it in a direction substantially perpendicular to the major planes of the lid and vapor baffle. Each spacer is located on a respective line bisecting opposite corners of the vapor baffle, and is located about 5 times the diameter of the spacer from a respective corner. For example, using spacers which are about ¾" in outside diameter on a vapor baffle which is about 13 inches by about 25 inches, each spacer is centered on a point about 2 inches from a respective corner. The spacers may be of any suitable material and size which will permit edges of the vapor baffle to make a releasable seal against the upper surface 125 of the top spray tube 58 when the lid is in the closed position shown in FIG. 5. To ensure this fit, and to avoid permanent deformation of the vapor barrier, the lid and baffle are assembled to the position shown in FIG. 5 by first placing the spacers in the required position on the surface of the vapor baffle which faces the lid. An interior portion of each spacer adjacent the vapor baffle is secured to the baffle by a welding bead 130. This confines the stress introduced by welding to the immediate vicinity of the spacer, and avoids permanent deformation of the vapor baffle, which preferably is relatively thin sheet of 16-gauge steel. With the vapor baffle resting on the upper spray manifold, and the spacers welded to the vapor baffle, as shown in FIG. 5, the lid is moved to the closed position. Four bores 134 drilled through the lid are each substantially collinear with a respective hole 124 extending through a respective spacer. The dimension of each spacer is such that there is a short distance between the end of the spacer adjacent the lid and the lid surface facing the vapor baffle. The lid is secured to the spacers and the vapor baffle by applying a respective welding bead 136 to each spacer. Each welding bead 136 fills a respective bore 134 and the upper end of a spacer hole 130.

The lid is releasably locked in the closed position shown in FIG. 5 by a latch 139, which includes a horizontal tab 140 secured at one end to the upper end of a vertical cap screw 142 threaded down into a coupling nut 144 welded to the interior vertical face of the center of the top frame. Thus, by rotating the tab 140 about a vertical axis, it engages with, or disengages from, the upwardly and inwardly inclined flange 40 of the forward edge of the lid.

Figure 8A:
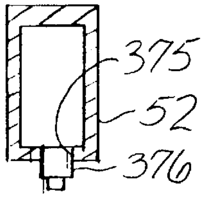
FIG. 8A is a view taken on line 8A—8A of FIG. 8.
Figure 8:
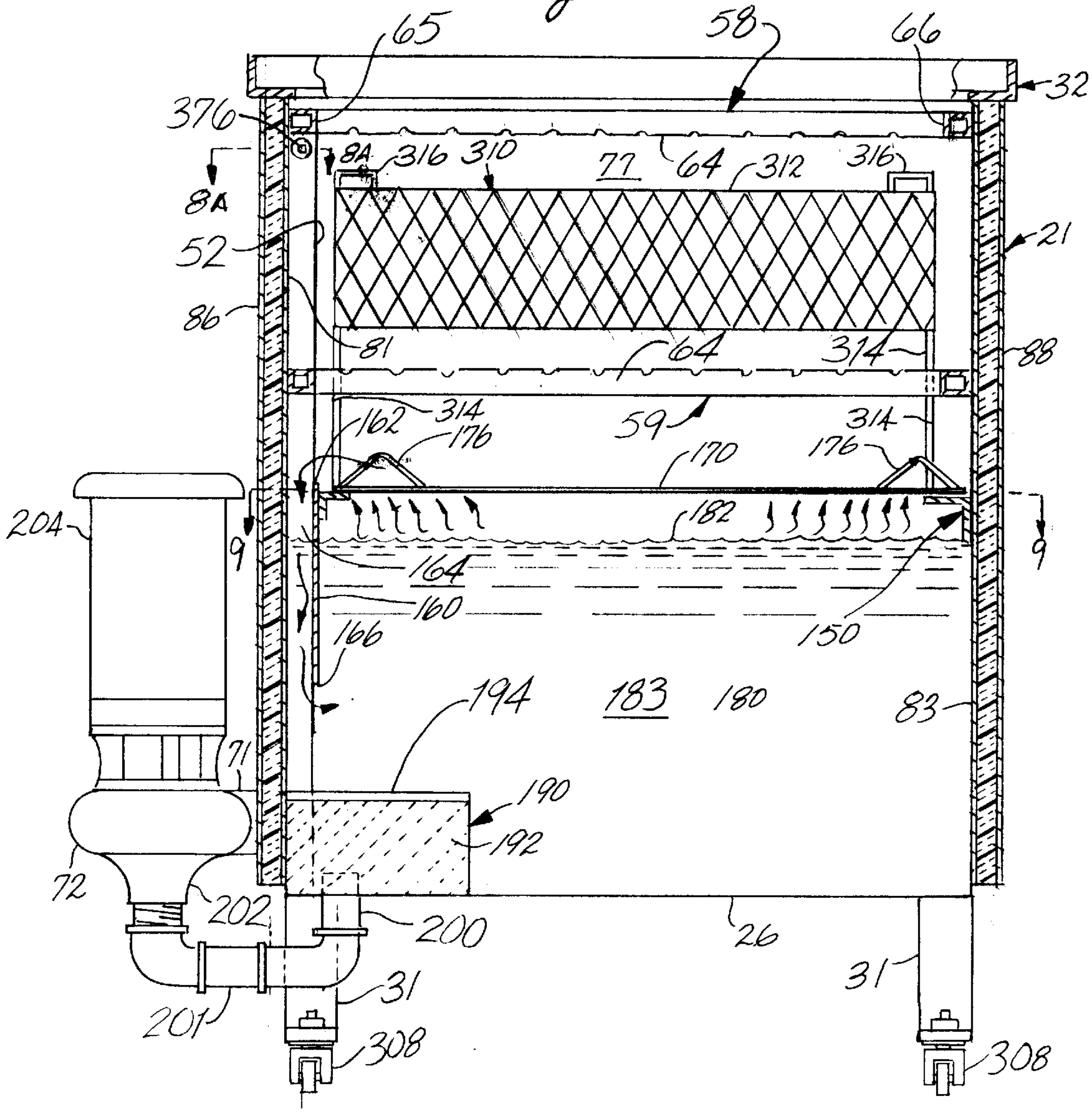
FIG. 8 is a view taken on line 8—8 of FIG. 4.
Figure 9:
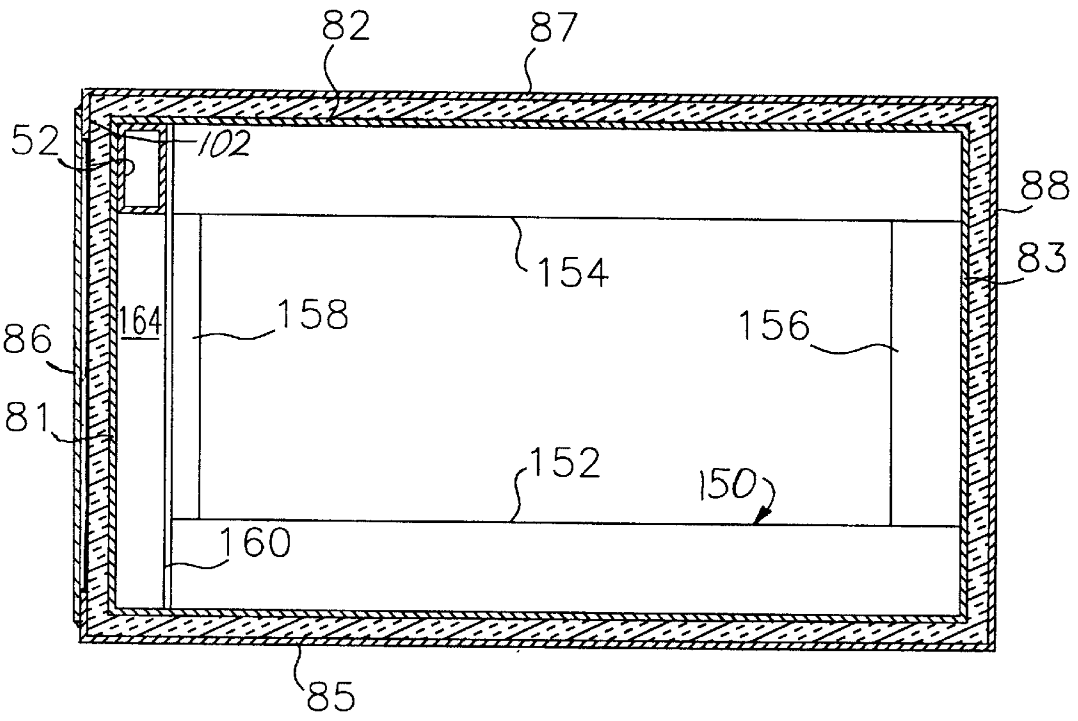
FIG. 9 is a view taken on line 9—9 of FIG. 8 (with the heat retention plate removed) showing an internal support frame which supports for the horizontal heat retention plate over the reservoir space in the parts washer.

Referring to FIGS. 8 and 9, a horizontal support frame 150 is welded to the inner faces of the inner front, rear and right walls at about the midpoint of the tank. As shown in FIG. 9, the support frame includes front and rear sections 152, 154, respectively, of angle iron. A right section 156 of angle iron is welded at its rear end to the right end of the rear section 154, and at its forward end to the right end of front section 152. A left section 158 of angle iron is welded at its rear end to the left end of rear section 154, and at its forward end to the left end of forward section 152. For the parts washer described herein, the front and rear sections are each made of 2"×2"×1⁄8" angle iron and are 247⁄8" long. The right section is made of 2"×2"×1⁄8" angle iron and is 97⁄8" long. The left section 158 is made of 1"×1"×1⁄8" angle iron and is 97⁄8" long. Each angle iron section of the frame opens downwardly and inwardly. Referring to FIG. 8, a vertical reservoir baffle 160 is welded adjacent its upper edge to the left end of the support frame so the upper edge 162 of the reservoir baffle projects slightly above the top of the support frame. The baffle is parallel to, and spaced about 1" from, the inner left wall to leave a drain gap 164, and to leave room for the manifold vertical riser 52, which terminates just above the tank bottom 26 in the left rear of the corner of the tank. The lower end of the vertical riser is sealed by a cap 165 (FIGS. 5 and 6) welded to the riser. The reservoir baffle is made of 12-gauge hot-rolled steel sheet 137⁄8"×7" so the lower edge 166 of the baffle terminates well above the bottom of the tank. The forward and rear edges of the reservoir baffle fit against the front and rear inner walls to which they are welded. The rear portion of the reservoir baffle is also welded to the manifold riser 52 for greater structural integrity.

A rectangular and horizontal heat retention plate 170 (FIG. 8) rests on the support frame to make a snug fit against the front, rear and right inner walls of the tank, and to terminate at its left edge just short of the upwardly projecting edge 162 of the reservoir baffle. A pair of upwardly extending handles 176 are welded at their lower ends to the top surface of the heat retention plate to facilitate placing the plate in the position shown in FIG. 8, and to facilitate removing the plate when desired.

A washing liquid 180 in the lower portion of the tank is maintained at an operating level 182 just below the heat retention plate. The frame, reservoir baffle and heat retention plate enclose a reservoir space 183 for heated washing liquid in the lower portion of the tank.

A pump intake strainer 190 in the lower left rear corner of the tank (FIGS. 1, 4 and 8) includes a vertical perforated strainer plate 192 disposed across the lower left rear corner of the tank and welded at its vertical edges to the left and rear inner walls. A solid horizontal cover plate 194 in the shape of a right triangle has its hypotenuse welded to the upper edge of the vertical perforated plate 192, and its left and rear edges welded to the left and rear inner walls, respectively. The left rear corner of the cover plate has a rectangular notch 196, which fits snugly against the forward and right sides of the manifold riser 52, which is welded to the notch edges of the cover plate.

The upper end of a vertical intake pipe 200 extends through the tank bottom into the pump intake strainer, and terminates a short distance above the tank bottom to minimize the pickup of sludge or any other solids which might pass through the strainer plate. The other end of the intake pipe 200 is connected by pipe fittings 201 to the intake 202 of the centrifugal pump 72, which is driven by an electrical motor 204. A 110-volt electrical immersion heater 250 (FIGS. 1 and 4) in the lower left forward portion of the tank is sealed by a conventional fitting 252 through the lower front portion of the left side of the tank, and is adapted to be connected to a standard electrical power outlet as shown in the circuit diagram of FIG. 14.

Figure 11:
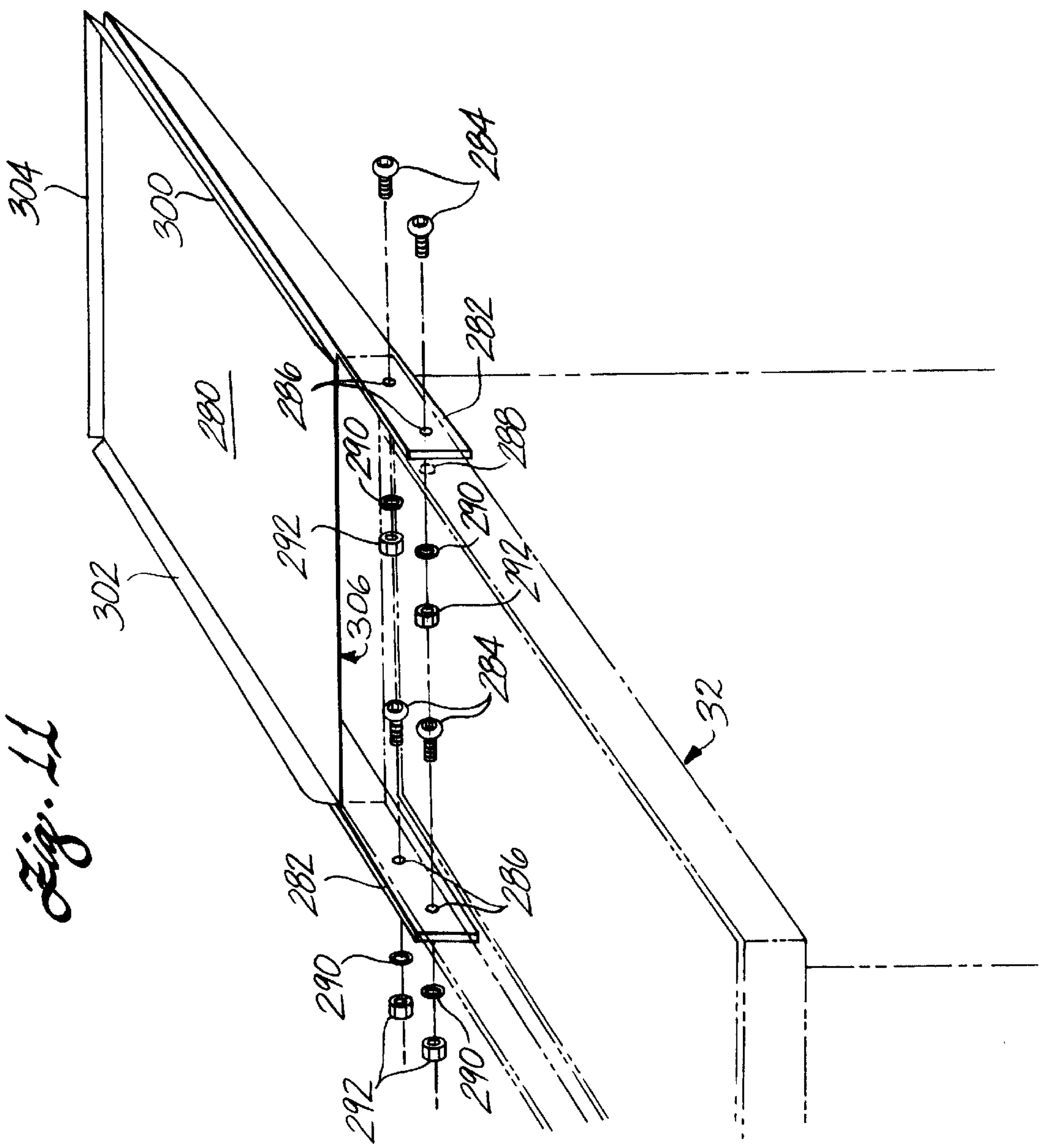
FIG. 11 is a perspective view of a shelf adapted to be attached to the upper end of the right side of the parts washer.

Referring to FIG. 11, a horizontal work shelf 280 includes a pair of front and rear horizontal arms 282 connected to the front and rear portions of the right end of the top frame by threaded bolts 284 extending through holes 286 in the arms and holes 288 in the frame to be locked in position by washers 290 and nuts 292. Upwardly and outwardly extending front, rear, and right lips 300, 302, and 304, respectively, are formed integrally along their lower edges with the respective front, rear, and right edges of the work shelf, which provides a convenient area for holding parts to be processed. The left edge 306 of the work shelf overlies the right side of upper frame 32. The shelf is about the same shape as the bottom of the tank, and slopes slightly downwardly toward the washer tank so water from parts placed on the shelf drains back into the tank because upper top frame 32 (made of upwardly and inwardly opening) sections of angle iron serves as a berm, which directs water from any edge of the tank into the tank interior.

The cantilevered work shelf eliminates the traditional diagonal braces, and frees up space below the shelf. Moreover, ease of shipment, and storage of the washer when not in use is facilitated by removing the two bolts at the left end of the arms to allow the shelf to hang down from the right end of the tank. When the washer is equipped with casters 308 (shown only in FIG. 8) on the lower ends of the four downwardly extending feet at each corner of the washer, the work shelf serves as a steering handle.

Figure 12:
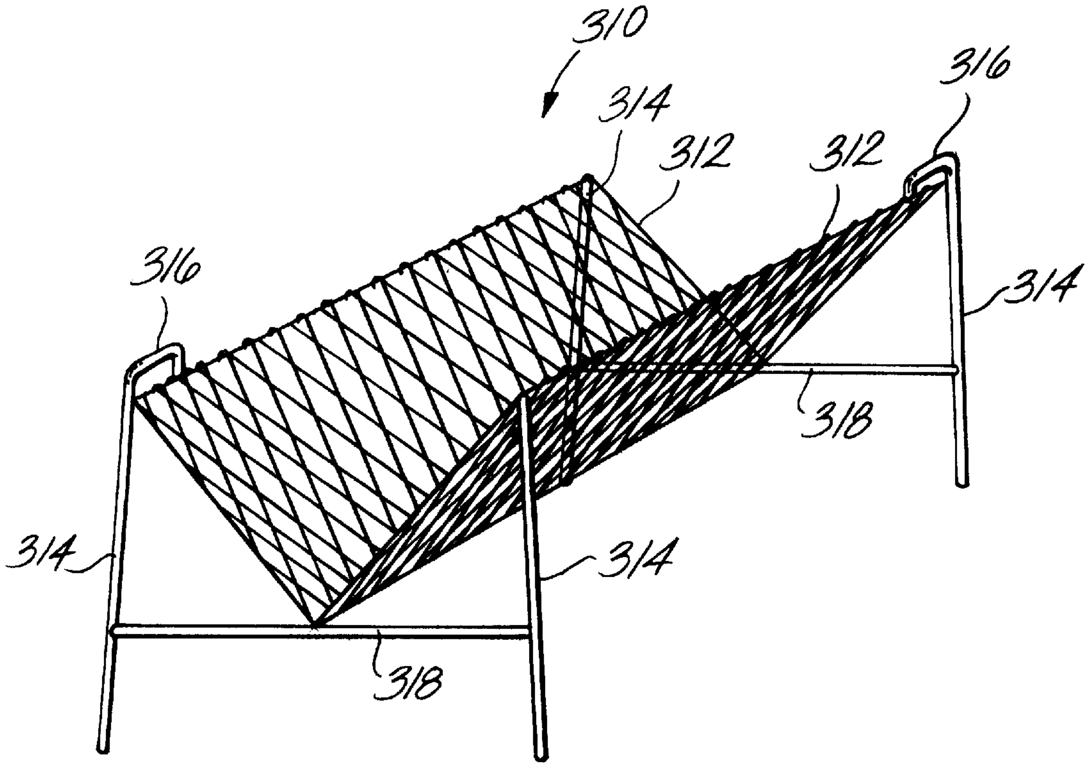
FIG. 12 is a perspective view of a V-shaped parts holder which fits in an upper portion of the parts washer as shown in FIG. 8.

FIG. 12 shows a V-shaped parts holder 310 adapted to fit in the tank of the washer as shown in FIG. 8. The parts holder of FIG. 12 includes a pair of downwardly and inwardly extending rectangular racks 312, which are of open mesh and formed by bending an expanded metal sheet along the adjacent lower and longer edges of the racks. The upper edges of the racks are rolled to provide stiffness and a smooth finish. A separate respective upwardly extending leg 314 is secured at its upper end to a respective upper corner of each rack. A pair of upwardly extending handles 316 are secured to opposite upper corners of the racks to facilitate moving the holder into and out of the tank. A separate horizontal cross bar 318 is welded at opposite ends to intermediate portions of respective legs at common ends of the rack. Each cross bar is welded at its center to a respective end of the holder where the two racks meet at their lower edges.

As shown in FIG. 8, the lower ends of the legs 314 of the V-shaped holder 310 rest on the horizontal plate 170 on the support frame 150 to position parts (not shown) in the holder for cleaning in the spray zone in the upper portion of the tank.

Figure 13:
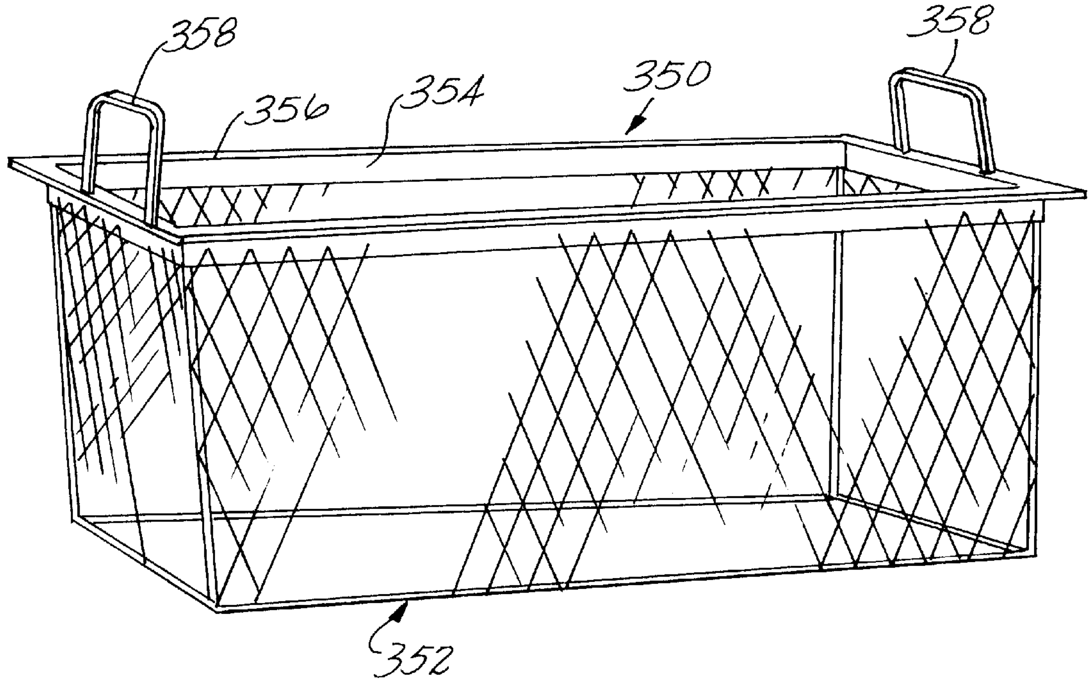
FIG. 13 is a perspective view of an open mesh basket adapted to fit in the reservoir space of the parts washer.

FIG. 13 shows a parts holder 350 in the shape of an open-top rectangular basket 352, which has open mesh sides and bottom. A rectangular frame 354 is welded around the upper edges of the basket. The frame includes an outwardly extending horizontal flange 356, which rests on the top surface of the support frame 150 (FIG. 8) in the washer when the heat retention plate has been removed. This permits parts which may require soaking to be subjected to the cleaning action of the hot washing liquid in the lower portion of the tank, even while other parts are subjected to spray action in the spray zone of the tank. For example, with the heat retention plate 170 removed from the tank, the lower ends of legs 314 of the V-shaped holder rest on the upper surfaces of the support frame 150. A separate upwardly and inwardly extending handle 358 at the upper edge of each end of the basket facilitates lowering and raising the basket in the washer with minimum exposure to possible contact with the washer interior.

As shown in FIGS. 8 and 8A the upper end of the forward wall of the manifold riser 52 includes a threaded opening 375 to form a pressure tap, which is normally closed by an externally threaded plug 376, which can be removed to permit a hose or other attachment (not shown) to be connected to the riser for applying washing liquid to parts which are otherwise difficult to clean. The pressure tap allows the operator to configure custom spray outlets to suit a specific need. It provides easy access to pressurized wash liquid for custom manifolding or attachment of a spray outlet bar or wand (not shown) to insert into cylinders, tubes, and the like, and to pressure-flush drilled passageways. For example, a piece of hose (not shown) with a series of holes drilled along its length can be connected to the pressure tap and then inserted in a dirty hydraulic cylinder, cleaning the inside where the normal manifold sprays cannot reach.

Referring to FIGS. 4 and 6A, a separate clean-out plug 377 is threaded into a respective clean-out port 378 in the lower part of the front end of the inner wall of the right section 66 of the upper and lower spray tubes 58 and 59, respectively. If spray holes in the manifold plug with solid contaminant, the holes are cleaned by sticking a cleaning tool (not shown) into the holes to force the contaminant into the spray tubes. The clean-out plugs are removed, and washing liquid is pumped through the spray manifold to wash the contaminant out the clean-out ports.

A lid switch 379 (FIG. 1) mounted on the top of a control box 380 on the outside of the left side of the tank is actuated by a curved finger 381 secured at one end to the left rear corner of the lid. The free end of the finger extends to the left and down into a channel-shaped switch guard 382 welded to the exterior of left section 46 of the frame 32. The free end of the finger moves into and out of the guard as the lid is raised and lowered about the hinges to activate the lid switch when the lid is closed.

Figure 14:
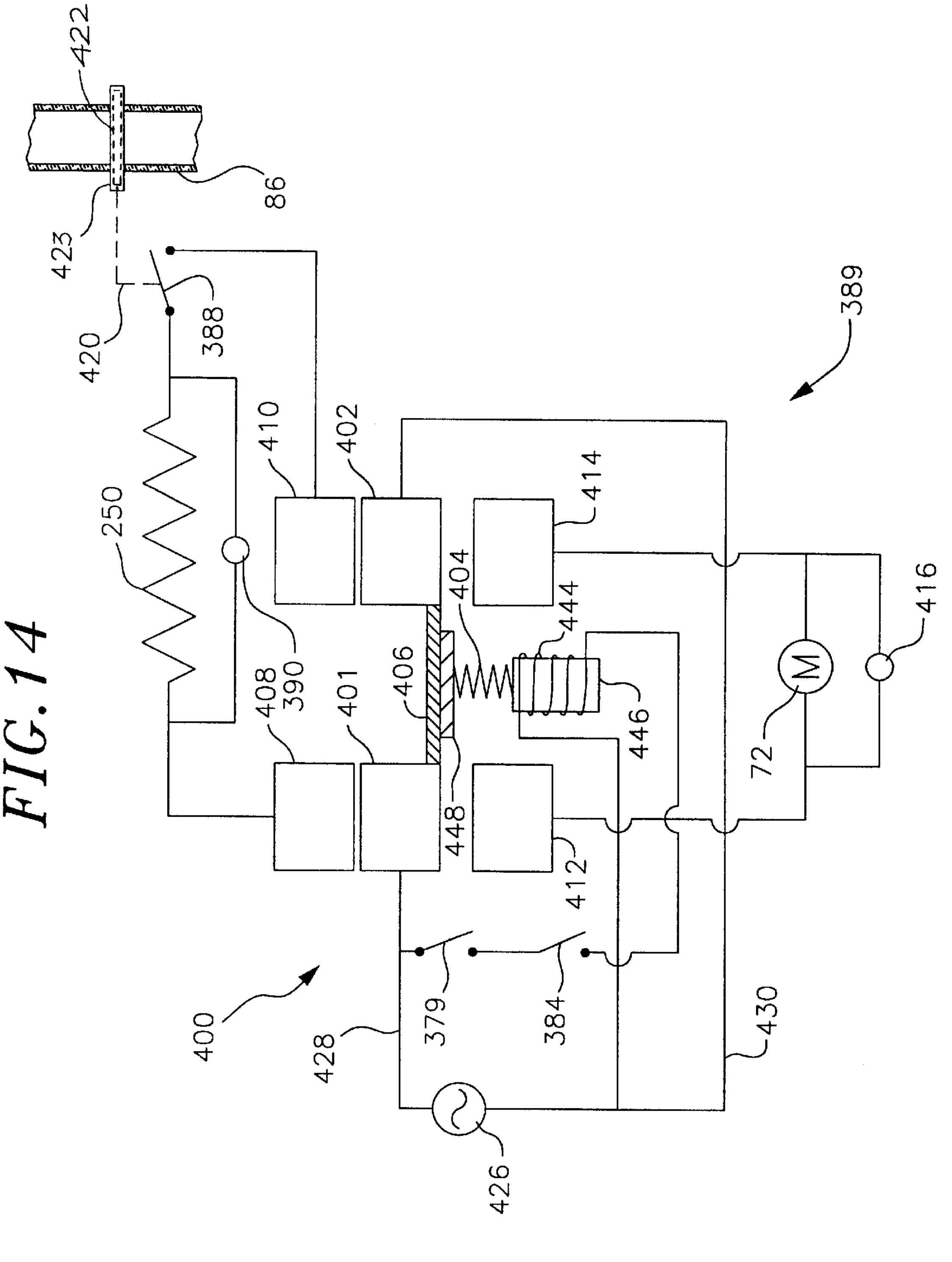
FIG. 14 is a schematic wiring diagram of a preferred circuit for controlling the heating and pumping means used in the parts washer.

A conventional timer switch 384 is mounted on the front face of the control box to turn the pump motor 204 on and off. A pump motor bulb 386 on the control box indicates when the pump is running. A conventional thermostat and switch 388 on the control box senses and controls the temperature of washing liquid in the tank, and is connected to the immersion heater in control circuit 389 as shown in FIG. 14. A heater bulb 390 indicates when the heater is on.

Referring to FIG. 14, a double-pole double-throw relay switch 400 includes a first pair of movable contacts 401 and 402, which are urged by a compression spring 404 acting on an insulator bar 406 connected to contacts 401 and 402 into a normally closed position with heater contacts 408 and 410, respectively.

A pair of normally open pump contacts 412 and 414 are connected to opposite sides of pump motor 72. Heater contacts 408 and 410 are connected in series with immersion heater 250 and thermostat switch 388, which opens and closes in response to the temperature of the washing solution in the tank. Linkage 420 from a thermostat bulb 422 mounted in a well 423 through the lower left side of the washer opens and closes the thermostat switch 388 to operate the heater to keep the washing liquid at the desired operating temperature. Heater bulb 390 is connected in parallel with heater 250 to indicate when the heater is operating.

A source of electrical power 426 supplies power through a first lead 428 to movable contact 401, and through a second lead 430 to movable contact 402. The lid switch 379 is connected in series with the pump motor timer switch 384, a solenoid coil 444, and the power source. With the lid closed, when the pump motor timer switch closes, current flows through the solenoid coil. A core 446 pulls a magnetic plate 448 secured to the insulator bar 406, and compresses spring 404 to move contact 401 against contact 412, and contact 402 against contact 414 so that power to the heater coil is interrupted and thereafter applied to the pump motor to cause heated washing liquid to be sprayed on parts (not shown) in the washer as described in more detail below.

To use the parts washer just described, power is supplied to the immersion heater 250 submerged in washing liquid in the reservoir space in the lower portion of the tank. While the washing liquid is being brought up to temperature, parts are loaded in the parts rack 310 (FIG. 12), which may conveniently be on the work shelf 280 mounted on the right side of the washer.

Once the washing liquid is up to the temperature, say about 160° F., as determined by the setting of the thermostat, the lid is unlocked by operation of the latch 139, and lifted to an open position (not shown) where the lid moves slightly past vertical and the lid stop 36 along the rear edge of the lid rests on the interior of the upper frame 32. The V-shaped holder with the parts to be cleaned is lowered to the position shown in FIG. 8 so the lower ends of the rack legs rest on the horizontal heat retention plate 170. Thus, the holder and parts in it are centrally located in the spray zone 77 to receive a spray of hot washing liquid from the spray holes 73 in the upper and lower spray tubes 58 and 59.

The primary cleaning factor provided by this invention, and missing from prior washers, is dwell time of sprayed washing liquid on the parts. Other factors, such as, pressure applied to the washing liquid, jet shape, gallons per minute, impact velocity of the spray on the parts, horsepower of the pump motor, temperature of the washing liquid, detergent strength and jet targeting are important, but the time the washing solution is sprayed on a particular area of a part being cleaned is paramount. In a typical prior art washer using a turntable which rotates above a vertical axis, the spray jets are pointed at only a very limited area, usually less than about 10% of the turntable area. The dirty parts in those prior art washers are therefore washed only about 10% if the time, spending about 90% of the wash cycle waiting for the turntable or manifold to move them in front of the jets. With the embodiment shown in the drawings, eighty precision jet sprays of washing liquid are trained on the parts being washed 100% of the time. Thus, jobs that require cycle time of 5 to 10 minutes in a prior art washer will clean in the parts washer of the present invention in less than about 30 seconds. Moreover, the insulated sidewalls of the parts washer tank of this invention make it possible to obtain thorough and rapid cleaning with washing solution maintained at a relatively safe temperature of about 160° F. Uninsulated prior art washers are often operated at significantly higher temperatures to compensate for heat loss. This wastes energy and water because of lost steam, and the handling of hot parts being washed compromises operator safety. The insulated parts washer of this invention insures that virtually all washing liquid heat makes it to the washed parts, and is not consumed in heating cold tank walls. Consequently, the temperature of the washing liquid in the reservoir space need not be as high as in uninsulated prior art washers.

Once the parts are loaded in the position shown in FIG. 8, the lid is closed and locked down in the position shown in FIG. 5 with latch 139. Closing of the washer lid closes the lid switch 379 (FIG. 14). The operator then turns the timer switch to the desired time required for the washing cycle, say 15 to 120 seconds, so that pump switch 384 (FIG. 14) closes for that set period of time. With both the lid switch and pump switch closed, power is applied to the solenoid coil 444 so that armature 448 moves contacts 401 and 402 out of contact with heater contacts 408 and 410. This interrupts the supply of electrical power to the immersion heater 250. The movable contacts are then pulled to pump motor contacts 412 and 414 to supply electrical power to the pump motor 72 after power has been disconnected from the immersion heater 250. Thus, the heater and pump do not ever operate at the same time, avoiding the necessity of an electrical power outlet rated any higher than 110 volts at 15 amps. Of course, the washer of this invention can be increased in size and capacity, and can be operated with a larger pump and motor, and with a larger heater, requiring greater voltage and amperage.

With the pump motor 72 in operation, heated washing liquid is sprayed through the spray tubes of the manifold and onto the parts in the rack 310. Sprayed washing liquid collects on the heat collection plate 170, flows over the upper edge 162 of the reservoir baffle 170, and drains down drain gap 164 to return under the lower edge 166 of the reservoir baffle to the reservoir space 181.

The V-shape of the rack is important because it presents a relatively large exposed area to spray jets from both the upper and lower spray tubes, and is particularly effective in simultaneously washing a plurality of flat objects. Moreover, the angle at which the parts are held prevents pooling of washing liquid, which would block the impact of sprayed washing liquid.

As shown best in FIG. 5, when the lid is locked in the closed position, the vapor baffle 120 seats against the upper surface of the upper spray tube to provide a low pressure seal for the space below the vapor baffle. When the washer lid is open, say, to load or remove parts, the cabinet fills with relatively cool air. When the lid is locked shut and the pump turned on, the heated washing liquid immediately heats the cooler air, causing the air to expand rapidly. The increased pressure below the vapor baffle deflects the forward edge of the baffle (which is less rigid than the rolled rear edge) slightly to permit compressed air and some steam and water droplets to flow between the forward edge of the vapor baffle and that part of the spray tube on which the forward edge of the baffle rests. The released air, steam, and water droplets flow rearwardly through the space between the vapor baffle and the lid, and are cooled as they approach the vent gap 49 between the rear edge of the lid and the rear section of the upper frame. As the cooled mixture of hot air, steam vapor and water droplets flow toward the vent gap 49, it loses velocity so that water droplets and condensed steam collect on the top of the vapor baffle. The collected water drains back into the tank when the lid is subsequently opened. The deflector 36 and frame section 44 (FIG. 5) direct the surge of escaping heated air upwardly so that it does not flow toward operating personnel.

Thus, the vapor baffle traps heat in the spray zone, and (in cooperation with the vent gap and deflector) also permits a surge of heated air to escape safely when the spray washer is first turned on. After the initial surge of heated air, the vapor baffle closes, and no significant amount of additional water vapor escapes from the tank. Therefore, the parts washer does not require steam vent stacking, as is the case with prior art washers.

Once the washing cycle ends in accordance with the time set on the timer switch, the pump motor switch 384 (FIG. 14) opens, interrupting electrical power supplied to the solenoid. This permits compression spring 404 to move contacts 401 and 402 away from pump motor contacts 412 and 414, and into contact with heater contacts 408 and 410 so that heating of the washing liquid starts immediately, if the temperature of the washing liquid in the tank is below that called for by the setting on the thermostat. Once the washing liquid is heated to the required temperature, thermostat switch 388 opens and no power is supplied to the heater.

After the washing cycle is complete, the latch (FIG. 5) is unlocked, the lid lifted to an open position, and the parts are removed. As the lid is opened, the parts flash-dry because they are still hot, and they continue to dry after being moved to any convenient location.

The washer of this invention keeps steam and heat from escaping from the heated washing liquid in the reservoir space 183 (FIG. 8) during loading and unloading of parts to be cleaned, and while the unit is operating, or sits idle. The heat retention plate 170 and reservoir baffle 160 keep the bulk of the working liquid at the desired operating temperature because there is no vapor path open from the reservoir space to the rest of the tank. The lower end of the drain gap 164 between the reservoir baffle 160 and the left side of the tank is closed by washing liquid. Thus, the heat retention plate 170 and reservoir baffle 160 keep steam and heat from escaping during loading and unloading of parts, and while the washer is idle. When the pump is on, washing liquid returns to the reservoir space 183 below liquid level via the drain gap 164. No steam escapes where the washing liquid returns because there is no open passageway for vapor. This saves energy, and allows the washer to operate without the need to replace evaporative loss.

The vapor baffle and the lid add to the energy saving because when the lid is closed, say during a wash cycle or while the washer is idle, the vapor baffle makes a good seal on the spray manifold, which prevents evaporation and heat loss, while also serving as a safe vent for a surge of excess pressure in the tank. The accurate location of the vapor baffle relative to the lid insures precise sealing contact between the lid and top frame, and simultaneously causes the vapor baffle to seal on the spray manifold with a force about equal to the weight of vapor baffle. This insures proper release of pressure by deflection of the forward edge of the baffle plate.

During the washing cycle, additional parts to be cleaned can be placed on a second parts holder (not shown) on the work station so that as soon as one washing cycle is completed and washed parts are removed, additional dirty parts can immediately be inserted into the washer for cleaning as described above.

Figure 15:
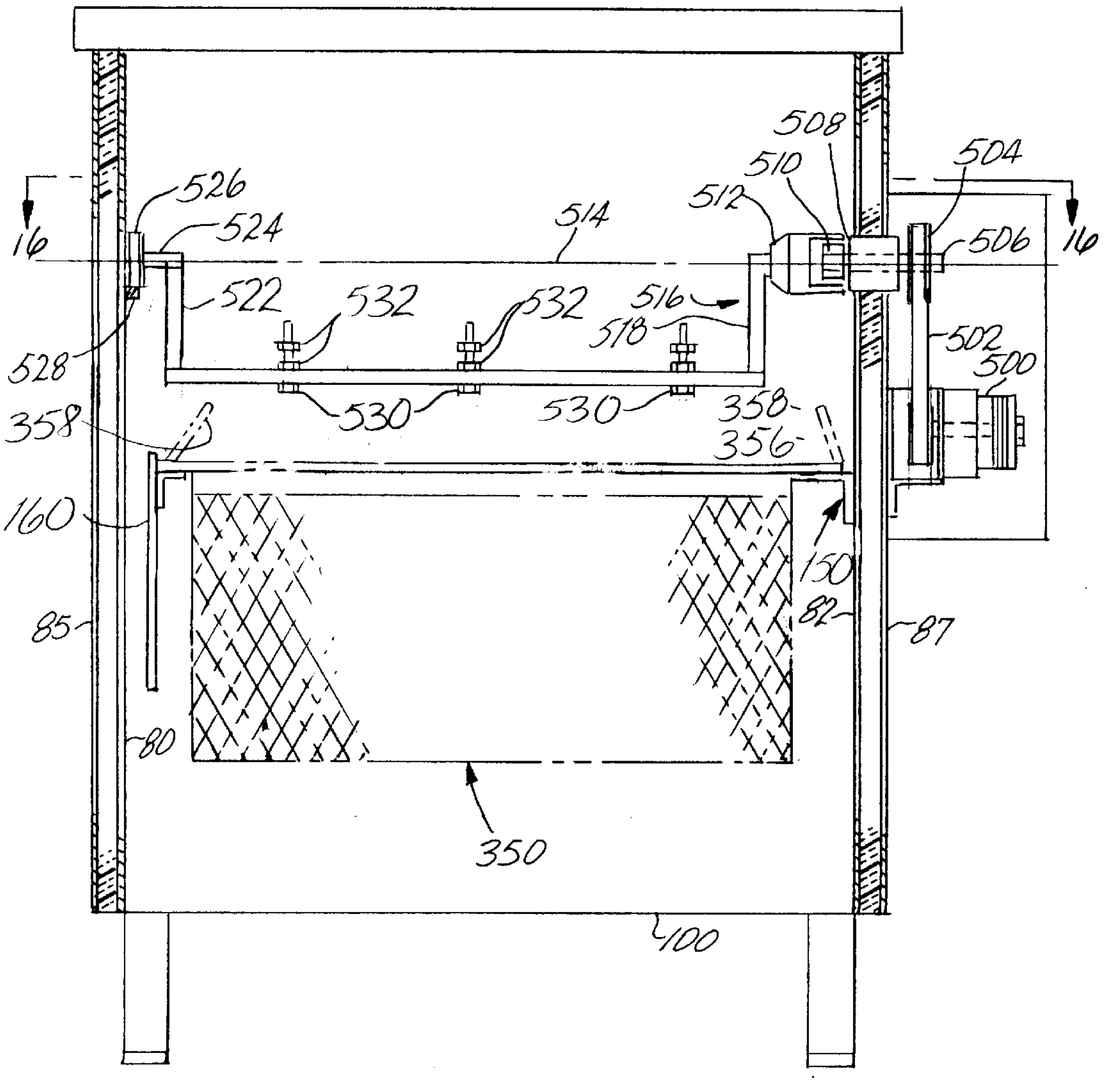
FIG. 15 is a schematic sectional elevation of the parts washer modified to receive a rotatable crank which carries parts to be washed.

The parts washer can be used in a manner different from that described above for cleaning parts which are more difficult than ordinary to clean. For such operation, the horizontal heat retention plate 170 (FIG. 8) is removed from the washer, and the dip tank basket 350 (FIG. 13) loaded with the parts which are difficult to clean is placed in the tank so that the outwardly extending flange on the basket rests on the upper surface of the support frame 150, and so that the parts in the basket are submerged for an agitate-and-soak cleaning cycle while at the same time a regular wash load in the V-shaped rack can be cleaned. (FIG. 15 shows basket 350 supported on frame 150 to extend down into washing liquid in the reservoir space.) During such operation, hot, pumped washing liquid continually flushes down into the basket, through the parts to be cleaned, and back to the pump intake strainer to be sprayed down again. The four legs of the V-shaped rack rest on the support frame just outward of the dip tank basket flange, allowing both parts holders to be used at the same time.

Figure 16:
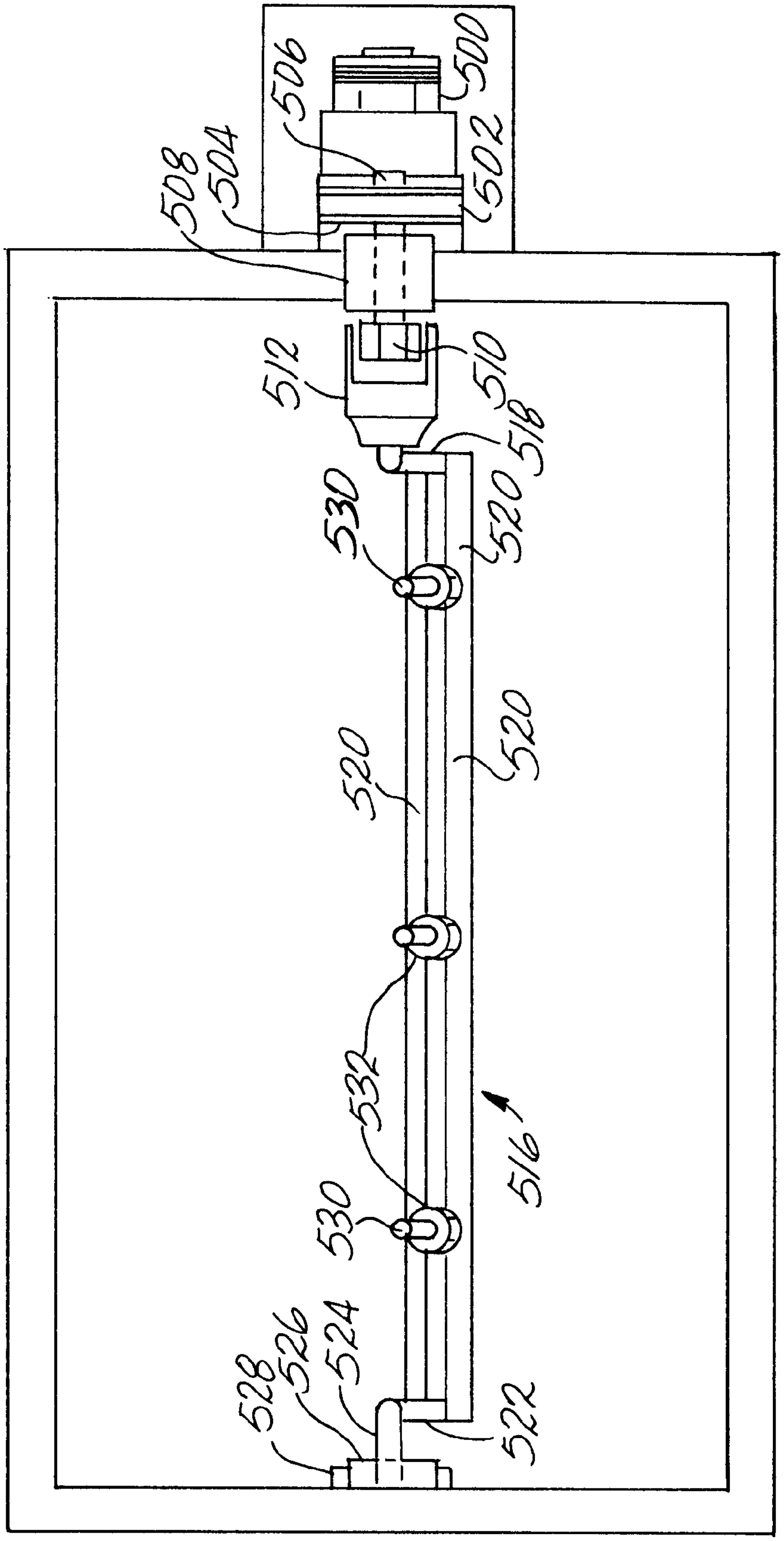
FIG. 16 is a view taken on line 16—16 of FIG. 15.
Figure 17:
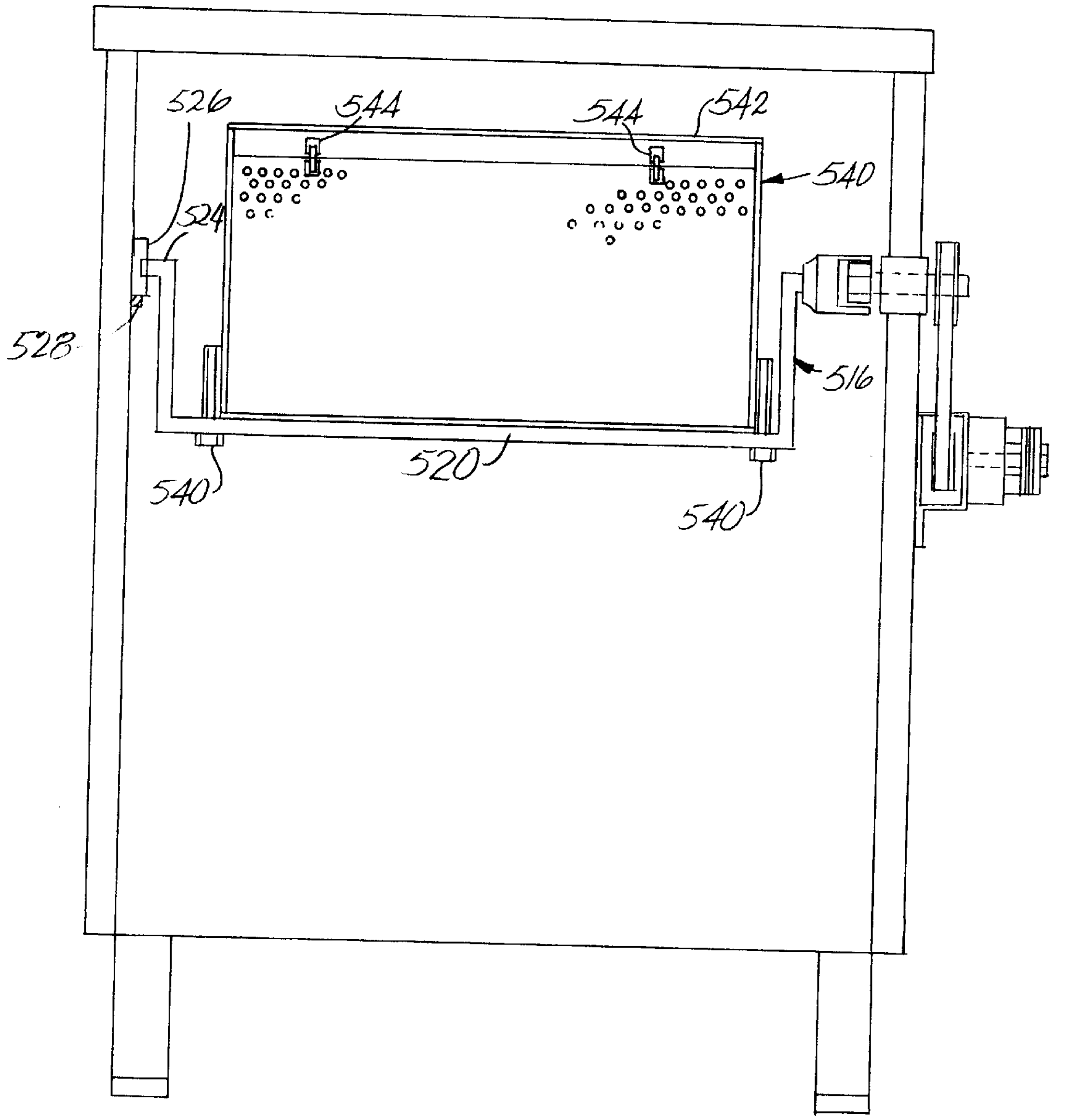
FIG. 17 is a view similar to FIG. 15, showing a parts holder mounted on the crank.

FIG. 15, 16 and 17 show the parts washer modified to handle parts which have been difficult to clean because of their shape, or because they block the spray when washed in mass, and then retain washing liquid, which slows drying time, and causes spotting and stains. FIGS. 15 and 16 are simplified views of the parts washer shown in FIG. 8. In the embodiment shown in FIGS. 15 and 16, a gear motor 500 is mounted on the right side of the washer and connected to electrical power through a toggle switch and indicator bulb (neither of which is shown). A belt 502 connects the gear motor to a pulley 504 mounted on a horizontal shaft 506 journaled through a bearing 508 mounted through the right side wall of the parts washer. A hex nut 510 is mounted on the inner end of the shaft 506 and fits in a hex socket 512 for rotation about a horizontal axis 514 in the tank. A crank 516 includes a radially extending first arm 518 connected at an inner end to the hex nut and at an outer end to the right ends of two horizontal and parallel bars (FIG. 16), which are laterally spaced from each other, and extend across the tank in a direction parallel to axis 514. The left ends of the parallel bars are each welded to the outer end of a second radially extending arm 522, the inner end of which is welded to a short shaft 524 collinear with pulley shaft 506. The left end of short shaft 524 is journaled in a bearing 526, which rests in an upwardly opening U-shaped support 528 welded to the interior surface of the left side wall of the tank.

Parts (not shown) to be cleaned are secured to the two parallel bars by longitudinally spaced bolts 530 and nuts 532, or various other clamping devices (not shown), and are cleaned by spray action as described above.

As shown in FIG. 17, a rectangular perforated basket 540 with a lid 542 held closed by latches 544 is secured to the two parallel bars 520 by bolts 540 extending up between the parallel bars 520 and into coupling nuts 541 welded to the exterior of the perforated basket 540. The perforated basket can be opened and filled with loose parts to be washed so that the center of gravity of the basket and parts lies approximately on the axis of shaft rotation for the crank 516, which is easily removed or installed by lifting the left side ball bearing out of its support far enough to permit the hex socket to disengage from the drive nut. In operation, the crank with parts attached to it, or the perforated basket with parts in the basket attached to the crank, is placed in the tank by first slipping the hex socket onto the hex drive nut at the right inside wall of the tank, and then lowering the left ball bearing end into the bearing support on the left inside wall. A spring (not shown) within the socket insures a slight thrust to the left to reduce "slop", noise and vibration. After closing the lid, the gear motor is turned on, and count down pump timer switch is also turned on, causing the rotor to turn and activating the pump, which circulates washing liquid through the spray manifold as previously described. The rotated parts are cleaned by the washing liquid jetting from the spray holes in the manifold spray tubes. After the timer shuts off the pump, rotation continues, draining and de-watering excess solution from cavities and other surfaces of the washed parts. This reduces water spotting, especially from small parts washed in mass. When the operator opens the lid of the parts washer, the parts flash-dry because they are still hot, and excess solution is removed. Finally, the gear motor is turned off, and the parts and/or crank assembly is removed as described above.

What is claimed is:

1. A parts washer comprising:

a) a tank having an upright wall, a bottom, and an open top;

b) a movable lid on the tank and shaped to cover most of the tank and leave a vent gap between the lid and tank wall;

c) a spray manifold mounted around the interior of the tank wall and adjacent an upper portion of the tank, the manifold having a rectangular cross section with longitudinally spaced spray holes through an edge of the manifold to spray washing liquid in a spray zone in the tank;

d) an electrically powered pump for pumping washing liquid from a lower portion of the tank through the manifold and out the spray holes to contact parts in the tank;

e) electrically powered heater in a lower portion of the tank for heating washing liquid in the tank;

f) a substantially horizontal heat retention plate disposed over most of the washing liquid in the lower portion of the tank;

g) a reservoir baffle extending downwardly from the plate and into the washing liquid to enclose a reservoir space for heated washing liquid, the reservoir baffle being shaped to provide communication between the reservoir space and the upper portion of the tank;

h) a deflectable vapor baffle disposed across the tank above the spray manifold to close off the interior of the tank below the vapor baffle from ambient air, the vapor baffle being spaced below the lid and constructed to release pressure from the tank in the space below the baffle;

i) a switching circuit for connecting a source of electrical power to the heater and disconnecting the power from the pump, and for connecting the power to the pump and disconnecting the power from the heater;

j) a switch responsive to the position of the lid for interrupting power to the heater and to the pump;

k) an outwardly extending cantilevered shelf mounted to the tank to support parts; and l) a parts support in the spray zone.

2. A parts washer comprising:

a) a tank for holding washing liquid;

b) a movable lid adapted to rest on an upper edge of the tank, the lid being shaped to cover most of the tank and leave a vent gap between the lid and a side of the tank;

c) an inwardly extending support secured to an upper portion of the tank below the lid;

d) a deflectable vapor baffle disposed on the support to close off the interior of the tank from ambient air;

e) a heater for heating the washing liquid; and f) a sprayer for spraying heated washing liquid on parts in the washer.

3. A parts washer according to claim 2 in which the vapor baffle is attached to and spaced under the lid so when the lid rests on the upper edge of the tank, the vapor baffle seats on the inwardly extending support.

4. A parts washer according to claim 2 or 3 in which the inwardly extending support is a spray manifold.

5. A parts washer according to claim 2 or 3 in which the inwardly extending support is a spray manifold made from a tube of substantially rectangular cross-section with inwardly extending holes through an edge of the tube.

6. A parts washer according to claim 5 which includes a second spray manifold spacer below the support, the second spray manifold being made from a tube of substantially rectangular cross-section with inwardly extending holes through an edge of the tube.

7. A parts washer according to claim 6 in which the spray holes through the second spray manifold extend inwardly and upwardly, and the holes through the other spray manifold extend inwardly and downwardly.

8. A parts washer according to claim 2 or 3 in which the deflectable vapor baffle has two opposite edges, and one edge is stiffer than the other.

9. Apparatus according to claim 8 in which the stiffer edge of the vapor baffle is closer to the vent gap than is the other edge.

10. Apparatus according to claim 9 in which the vapor baffle is made of sheet metal, and the stiffer edge is rolled.

11. A spray manifold comprising an elongated tube of substantially rectangular cross-section having longitudinally spaced holes drilled through an edge of the tube, the inner end of each hole being concave inwardly, and the outer end of each hole being concave outwardly.

12. A manifold according to claim 11 in which the tube is in shape of a polygon lying in a substantially flat plane.

13. Apparatus according to claim 11 or 12 which includes a riser connected to the tube, and the holes have a diameter of between about 5/64" and about 9/64", and the distance between adjacent holes is between about 1" and about 3".

14. A spray manifold comprising a first elongated tube of substantially rectangular cross-section having longitudinally spaced holes drilled through an edge of the first tube, a second elongated tube of substantially rectangular cross-sections having longitudinally spaced holes drilled through an edge of the second tube, the inner end of each hole being concave inwardly and the outer end of each hole being concave outwardly, and a riser connected to the two tubes.

15. Apparatus according to claim 14 in which each of the two tubes in the shape of a polygon and each lie in a respective substantially flat plane.

16. An elongated spray manifold according to claim 14 or 15 in which the manifold has longitudinally spaced spray holes extending through the manifold, an inlet opening in the manifold for supplying washing liquid under pressure to the spray holes, an auxiliary port in the manifold, the port having a substantially greater cross-sectional area than each of the spray holes, and a closure member for releasably sealing the port.

17. Apparatus according to claim 16 in which the port and closure member have mating threaded sections.

18. A cover for a tank having an upright wall with an upper edge, and a support means in the tank, the cover comprising:

a) A movable lid shaped to rest on the upper edge of the tank wall and leave a vent gap between the lid and the wall;

b) a vapor baffle secured to and spaced below the lid, the vapor baffle being shaped to rest on the support in the tank when the lid rests on the upper edge of the tank wall so the vapor baffle substantially closes off the interior of the tank below the vapor baffle from ambient air.

19. Apparatus according to claim 18 in which the distance between the upper edge of the tank wall and the support in the tank is substantially equal to that between the lid and the vapor baffle so when the lid rests on the upper edge of the tank, the vapor baffle seats on the support.

20. Apparatus according to claim 18 or 19 in which the lid and vapor baffle are each made of metal, and are secured together by spacers each welded to the lid and the vapor baffle.

21. Apparatus according to claim 20 in which each spacer has a hole extending through it in a direction transverse to the major surfaces of the lid and vapor baffle, and an interior portion of the hole is welded to the lid and to the vapor baffle.

22. Apparatus according to claim 21 in which the lid has a separate respective bore extending through it substantially collinear with the hole through each respective spacer, and the interior of each respective lid bore is welded to the interior of a respective spacer hole.

23. A parts washer comprising:

a) a tank with a wall and a bottom for holding a washing liquid in a lower portion of the tank;

b) a spray manifold for spraying parts in an upper portion of the tank with washing liquid;

c) a heater for heating washing liquid in the tank;

d) a pump for pumping heated washing liquid to the spray manifold;

e) a substantially horizontal removable heat retention plate disposed over most of the surface of the washing liquid in the tank, the plate being shaped to leave a drain between an edge of the plate and the wall of the tank; and f) a reservoir baffle extending downwardly from the plate and into the washing liquid to enclose a reservoir space for heated washing liquid in the lower portion of the tank, the reservoir baffle being shaped to provide communication between the reservoir space and the upper portion of the tank.

24. Apparatus according to claim 23 which includes a handle on the heat retention plate to facilitate lifting it from and placing it in the washer.

25. Apparatus according to claim 23 or 24 in which an upper edge of the reservoir baffle is disposed above the heat retention plate to impede settlable solids in the washing liquid from flowing off the plate.

26. A parts washer comprising:

a) a tank for holding washing liquid;

b) electrically powered heater for heating the liquid;

c) a sprayer for spraying heated liquid on parts in the tank;

d) an electrically powered pump for pumping heated liquid in the tank through the sprayer; and e) a circuit for automatically connecting power to the heater and disconnecting the power from the pump when power is connected to the heater, and for disconnecting power from the heater and connecting power to the pump when power is disconnected from the heater.

27. Apparatus according to claim 26 in which the circuit includes a relay switch which has a first pair of normally closed contacts and a second pair of normally open contacts; a solenoid for reversing the condition of the contacts; means for connecting the source of power to the heater through the normally closed contacts; means for connecting the power to the pump through the normally open contacts; and means for energizing the solenoid to open the first pair of contacts and close the second pair.

28. Apparatus according to claim 26 or 27 which includes a movable lid on the tank, and switching means responsive to the lid position for interrupting power to the pump when the lid is in an open position.

29. A parts holder for holding parts to be washed in a parts washer which includes a tank for holding a washing liquid, a sprayer for spraying washing liquid into an upper portion of the tank, an inwardly extending support in the tank, the parts holder comprising:

a) a pair of downwardly and inwardly extending open mesh racks secured together at respective lower edges; and b) the holder being adapted to rest on the support in the tank and hold parts on the racks in the path of sprayed liquid in the upper portion of the tank.

30. A parts holder according to claim 29 which includes legs secured to the holder and adapted to rest on the support.

31. A parts holder according to claim 29 or 30 which includes handles to facilitate placing the holder in, and removing the holder from, the parts washer.

32. A parts washer comprising:

a) a tank for holding a washing liquid;

b) a parts bracket in the shape of a crank mounted in the tank for rotation about a substantially horizontal axis;

c) means for securing parts to the bracket so the axis extends substantially through the center of gravity of the parts;

d) means for rotating the bracket; and e) means for spraying washing liquid on parts mounted on the bracket as the bracket rotates.

33. Apparatus according to claim 32 in which the parts bracket is mounted so it can be placed in, and removed from, the tank without the use of a tool.

34. A parts washer comprising:

a) a tank for holding a washing liquid;

b) a parts support bracket mounted in the tank for rotation about a substantially horizontal axis, the bracket being in the shape of a crank with an elongated bar laterally offset from, and substantially parallel to, the axis of rotation;

c) an open mesh basket for holding parts, the basket being mounted on the bar;

d) means for rotating the bracket; and e) means for spraying washing liquid on parts in the basket as the bracket is rotated.

35. Apparatus according to claim 33 in which the basket is mounted on the bar so the axis of rotation passes substantially through the center of gravity of the basket.

36. A parts washer comprising:

a) a tank for holding a washing liquid in a lower portion of the tank;

b) a first support for at least one part to be washed in an upper portion of the tank above the washing liquid;

c) a removable basket for at least one other part, the basket being supported in the washing liquid in the lower portion of the tank; and d) a sprayer for spraying washing liquid on the part in the upper portion of the tank while the other part is in washing liquid in the lower portion of the tank.

37. Apparatus according to claim 36 in which the basket is open mesh.

38. Apparatus according to claim 37 in which the basket has handles that extend upwardly and inwardly.

39. A container for holding parts to be washed in a tank having inwardly extending support means, the container comprising:

a) an open mesh basket for the parts;

b) an outwardly extending flange mounted on opposite sides of the basket; and c) upwardly and inwardly extending handles mounted on opposite sides of the basket.

40. A parts washer comprising:

a) a tank for holding washing liquid;

b) a heater for heating the liquid;

c) a sprayer for spraying heated liquid on parts in the tank;

d) a pump for pumping heated liquid in the tank through the sprayer;

e) an outwardly extending cantilevered shelf secured to the tank by a pair of elongated and laterally spaced arms secured to the shelf and the tank, each arm including a pair of longitudinally spaced and transverse bores; and f) a separate bolt extending through each bore to secure the arms to the tank, at least one of the bolts on each arm being releasably secured to the tank so the releasable bolts can be disconnected from the tank to permit the shelf to pivot about the other bolts between a substantially horizontal position and a lower position.

41. A tank comprising:

an upright inner wall having an upper edge and a lower edge;

a bottom secured to the lower edge of the inner wall;

a frame secured to one edge of the inner wall;

an upright outer wall first segment which surrounds and is spaced from a major portion of the inner wall, the first segment having an upper edge and a lower edge, one of the edges being secured to the frame; and an upright outer wall second segment which surrounds and is spaced from the portion of the inner wall not surrounded by the first segment, the second segment being secured to the first segment to form an outer wall which surrounds and is spaced from the inner wall.

42. A tank comprising:

an upright inner wall with upper and lower edges, and with inner front, left, rear and right sides;

a bottom secured to the lower edge of the inner wall;

a frame secured to one edge of the inner wall;

a continuous sheet shaped to form an upright outer wall segment with upper and lower edges, and which includes outer front, rear and right sides each spaced from and substantially parallel to respective front, rear and right sides of the inner wall, one edge of the outer wall segment being bonded to the forms;

an upright outer left side spaced from and substantially parallel to the inner left side of the inner wall; and means securing the outer left side to the outer front and rear sides to form an outer wall which surrounds and is spaced from the inner wall.

43. A tank according to claim 41 or 42 which includes insulation in the space between the inner and outer walls.

44. A tank according to claim 42 in which the continuous sheet is metal, and includes a separate upright welding flange formed integrally with a respective upright edge of the respective left ends of the outer front and rear sides, each flange extending toward the other, and the outer left side is a metal sheet welded to the flange.

45. A parts washer comprising:

a) a tank having an upright inner wall having an upper edge and a lower edge, a bottom secured to the lower edge of the inner wall, a frame secured to one edge of the inner wall, an upright outer wall first segment which surrounds and is spaced from a major portion of the inner wall, the first segment having an upper edge and a lower edge, one of the edges being secured to the frame, and an upright outer wall second segment which surrounds and is spaced from the portion of the inner wall not surrounded by the first segment, the second segment being secured to the first segment to form an outer wall which surrounds and is spaced from the inner wall;

b) a movable lid on the tank and shaped to cover most of the tank and leave a vent gap between the lid and tank wall;

c) a spray manifold in the shape of a polygon lying in a substantially flat plane mounted around the interior of the tank wall and adjacent an upper portion of the tank, the manifold having a rectangular cross section with longitudinally spaced spray holes through an edge of the manifold to spray washing liquid in a spray zone in the tank;

d) electrically powered pump for pumping washing liquid from a lower portion of the tank through the manifold and out the spray holes to contact parts in the tank;

e) electrically powered heater in a lower portion of the tank for heating washing liquid in the tank;

f) a substantially horizontal heat retention plate disposed over most of the washing liquid in the lower portion of the tank;

g) a reservoir baffle extending downwardly from the plate and into the washing liquid to enclose a reservoir space for heated washing liquid, the reservoir baffle being shaped to provide communication between the reservoir space and the upper portion of the tank;

h) a deflectable vapor baffle disposed across the tank above the spray manifold to close off the interior of the tank below the vapor baffle from ambient air, the vapor baffle being spaced below and connected to the lid by a spacer having a hole through it in a direction transverse to the vapor baffle, a welding bead in the hole to connect the spacer to the lid, the lid being constructed to release pressure from the tank in the space below the baffle;

i) a switching circuit for connecting a source of electrical power to the heating means and disconnecting the power from the pumping means, and for connecting the power to the pumping means and disconnecting the power from the heating means;

j) a switch responsive to the position of the lid for interrupting power to the heating means and to the pumping means;

k) an outwardly extending cantilevered shelf mounted to the tank to support parts;

l) a inwardly extending support frame mounted in the tank;

m) an open mesh V-shaped basket in the tank to hold the parts;

n) an outwardly extending flange mounted on opposite sides of the basket to rest on the support frame; and o) upwardly and inwardly extending handles mounted on opposite sides of the basket.

46. A parts washer comprising:

a) a tank with a wall and a bottom for holding a washing liquid in a lower portion of the tank;

b) a spray manifold for spraying parts in an upper portion of the tank with washing liquid;

c) a heater for heating the washing liquid in the tank;

d) a pump for pumping heated washing liquid to the spray manifold;

e) a substantially horizontal removable heat retention plate disposed over most of the surface of the washing liquid in the tank, the plate being shaped to provide a drain from the upper portion of the tank down into the lower portion of the tank; and f) a reservoir baffle extending downwardly from the drain into the washing liquid to isolate the surface of washing liquid in the drain from the surface of the rest of the washing liquid in the lower portion of the tank, the reservoir baffle being shaped to provide communication between liquid in the drain and the rest of the liquid in the lower portion of the tank.

47. Apparatus according to claim 46 which includes a handle on the heat retention plate to facilitate placing it in and lifting it from the washer.

48. A parts washer according to claim 23 or 46 which includes a pump inlet connected to the pump, and disposed below the midpoint of the lower portion of the tank.

* * * * *